United States Patent
Chen

(10) Patent No.: US 12,373,918 B2
(45) Date of Patent: Jul. 29, 2025

(54) PICTURE ENHANCEMENT METHOD AND APPARATUS

(71) Applicant: HANGZHOU HIKVISION DIGITAL TECHNOLOGY CO., LTD., Zhejiang (CN)

(72) Inventor: Fangdong Chen, Zhejiang (CN)

(73) Assignee: HANGZHOU HIKVISION DIGITAL TECHNOLOGY CO., LTD., Zhejiang (CN)

(*) Notice: Subject to any disclaimer, the term of this patent is extended or adjusted under 35 U.S.C. 154(b) by 382 days.

(21) Appl. No.: 17/928,437

(22) PCT Filed: Jun. 3, 2021

(86) PCT No.: PCT/CN2021/098177
§ 371 (c)(1),
(2) Date: Nov. 29, 2022

(87) PCT Pub. No.: WO2021/244617
PCT Pub. Date: Dec. 9, 2021

(65) Prior Publication Data
US 2023/0214969 A1 Jul. 6, 2023

(30) Foreign Application Priority Data
Jun. 5, 2020 (CN) .................. 202010508167.4

(51) Int. Cl.
*G06T 5/20* (2006.01)
*G06V 10/75* (2022.01)
(Continued)

(52) U.S. Cl.
CPC .............. *G06T 5/20* (2013.01); *G06V 10/751* (2022.01); *H04N 19/117* (2014.11); *H04N 19/82* (2014.11); *H04N 19/86* (2014.11)

(58) Field of Classification Search
None
See application file for complete search history.

(56) References Cited

U.S. PATENT DOCUMENTS

| 5,446,501 A | 8/1995 | Takemoto et al. |
| 5,694,492 A | 12/1997 | Kim |

(Continued)

FOREIGN PATENT DOCUMENTS

| CN | 107750459 | 3/2018 |
| CN | 110495168 | 11/2019 |

(Continued)

OTHER PUBLICATIONS

European Patent Office, Extended European Search Report Issued in the corresponding European Application No. 21816788.0, Oct. 9, 2023.

(Continued)

*Primary Examiner* — Leon Viet Q Nguyen
(74) *Attorney, Agent, or Firm* — Ladas & Parry, LLP

(57) ABSTRACT

Provided are a picture enhancement method and apparatus. The picture enhancement method includes: for any one pixel, which meets a first filtering condition, in a current block, determining a first pixel value of the pixel after first filtering; and performing enhancement on a pixel value of the pixel based on the first pixel value and a second pixel value of the pixel point before the first filtering, so as to obtain a third pixel value, which has been subjected to enhancement, of the pixel.

18 Claims, 4 Drawing Sheets

(51) Int. Cl.
  *H04N 19/117* (2014.01)
  *H04N 19/82* (2014.01)
  *H04N 19/86* (2014.01)

(56) References Cited

U.S. PATENT DOCUMENTS

| | | | |
|---|---|---|---|
| 6,778,692 | B1 | 8/2004 | Yazici |
| 7,999,972 | B2 | 8/2011 | Goto et al. |
| 8,139,269 | B2 | 3/2012 | Goto et al. |
| 8,441,701 | B2 | 5/2013 | Goto et al. |
| 9,344,716 | B2 | 5/2016 | Seregin |
| 10,600,156 | B2 * | 3/2020 | Kim ................. H04N 19/82 |
| 2008/0123152 | A1 | 5/2008 | Goto et al. |
| 2010/0165207 | A1 * | 7/2010 | Deng .................. H04N 5/144 348/620 |
| 2011/0267655 | A1 | 11/2011 | Goto et al. |
| 2012/0147432 | A1 | 6/2012 | Goto et al. |
| 2012/0201311 | A1 * | 8/2012 | Sole .................. H04N 19/182 375/E7.193 |
| 2013/0243104 | A1 | 9/2013 | Chen et al. |
| 2016/0180504 | A1 * | 6/2016 | Kounavis ................. G06T 5/40 348/241 |
| 2017/0013280 | A1 | 1/2017 | Norkin et al. |
| 2019/0297320 | A1 | 9/2019 | Yoshiya et al. |

FOREIGN PATENT DOCUMENTS

| | | | | |
|---|---|---|---|---|
| CN | 111133757 | | 5/2020 | |
| EP | 0680219 | A2 * | 11/1995 | ............... H04N 7/30 |
| EP | 2 62 4555 | | 8/2013 | |
| JP | 2002354256 | A | 12/2002 | |
| JP | 2008017291 | | 1/2008 | |
| KR | 10-2012-0140181 | | 12/2012 | |
| RU | 2550541 | C2 | 5/2015 | |
| RU | 2651183 | C2 | 4/2018 | |
| RU | 2679190 | C2 | 2/2019 | |
| WO | 2012/042821 | | 4/2012 | |
| WO | 2017/195532 | | 11/2017 | |
| WO | 2018123800 | A1 | 7/2018 | |
| WO | 2021244617 | A1 | 12/2021 | |

OTHER PUBLICATIONS

Andrey Norkin et al, "Chapter 7: In-Loop Filters in HEVC", In: High Efficiency Video Coding (HEVC), Springer International publishing, Cham, pp. 171-208, Aug. 23, 2014, 38 pages.
Yu-Ling Hsiao et al, "CE13-1.1: Convolutional neural network loop filter", Joint Video Experts Team (JVET) of ITU-T SG 16 WP 3 and ISO/IEC JTC 1/SC 29/WG 11, JVET-N0110-v1, 14th Meeting: Geneva, CH, Mar. 19-27, 2019, 5 pages.
Australian Patent Office, Office Action Issued in the corresponding Australian Application No. 2021283592, Jul. 20, 2023, 3 pages.
Australian Patent Office, Office Action Issued in the corresponding Australian Application No. 2021283592, Oct. 31, 2023, 4 pages.
Japanese Patent Office Action, Office Action Issued in Application No. 2022-574287, Oct. 2, 2023, 8 pages, (Submitted with Partial Translation) .
TW Patent Office, Office Action Issued in the corresponding Taiwan Application No. 110120516, Jul. 24, 2023, 5 pages (Submitted with Partial Translation).
International Search Report for PCT/CN2021/098177 mailed on Aug. 18, 2021and its English translation provided by WIPO.
Written Opinion of the International Searching Authority for PCT/CN2021/098177 mailed on Aug. 18, 2021 and its English translation provided by Google Translate.
Chinese Office Action and Search Report for Application No. 2020105081674, issued on Mar. 28, 2022, with English translation provided by global dossier.
Fang Tao et al. "Research on deblocking filter in High Efficiency Video Coding (HEVC)", Chinese Master's Theses Full-text Database, Feb. 15, 2018, and its English translation provided by applicant's foreign counsel.

* cited by examiner

PICTURE ENHANCEMENT METHOD AND APPARATUS

CROSS REFERENCE TO RELATED APPLICATIONS

The present application is a U.S. National Stage of International application No. PCT/CN2021/098177 filed on Jun. 3, 2021, which claims a priority to the Chinese patent application No. 202010508167.4 filed on Jun. 5, 2020, the disclosures of which are incorporated herein by reference in their entireties for all purposes.

TECHNICAL FIELD

The present application relates to the video picture coding and decoding technology, and in particular relates to picture enhancement methods and apparatuses.

BACKGROUND

Complete video coding may include operations such as prediction, transform, quantization, entropy coding, filtering and so on.

At present, common filtering technology used in a standard may include DeBlocking Filter (DBF) technology, Sample Adaptive Offset (SAO) technology and Adaptive Loop Filter (ALF) technology.

The DBF technology can be used to remove blocking artifact caused by block coding. In SAO technology, by performing classification based on pixel values of samples and gradient values of surrounding blocks, and adding different compensation values for pixel values of categories, a reconstructed picture can be more similar to an original picture. In the ALF technology, enhancement filtering is performed on a reconstructed picture with a Wiener filter, such that the reconstructed picture can be more similar to an original picture.

In all of the above DBF, SAO and ALF filtering technology, classification is performed based on a pixel value of a current pixel, or a relationship between the pixel value of the current pixel and one or more pixel values of surrounding pixel(s), and different filtering operations are performed based on different categories. In this way, a phenomenon of over-filtering may occur, i.e., a filtered pixel value is much larger or smaller than a pixel value before the filtering, and also much larger or smaller than an original pixel value.

SUMMARY

In view of this, the present application provides picture enhancement methods and apparatuses.

Specifically, the present application is realized through the following technical solutions. According to a first aspect of embodiments of the present application, a picture enhancement method is provided, including: determining, for any one pixel, that meets a first filtering condition, within a current block, a first pixel value of the pixel after first filtering; and obtaining an enhanced third pixel value of the pixel by performing, based on the first pixel value and a second pixel value of the pixel before the first filtering, enhancement on a pixel value of the pixel.

According to a second aspect of embodiments of the present application, a picture enhancement apparatus is provided, including a processor, a communication interface, a memory and a communication bus, where the processor, the communication interface, and the memory completing communication with each other via the communication bus; the memory stores a computer program, and the processor is caused by the computer program to determine, for any one pixel, that meets a first filtering condition, in a current block, a first pixel value of the pixel after first filtering; and obtain an enhanced third pixel value of the pixel by performing, based on the first pixel value and a second pixel value of the pixel before the first filtering, enhancement on a pixel value of the pixel.

In the picture enhancement methods provided in the embodiments of the present application, for any one pixel, that meets a first filtering condition, in a current block, a first pixel value of the pixel after first filtering is determined. Based on the first pixel value and a second pixel value of the pixel before the first filtering, enhancement can be performed on a pixel value of the pixel to obtain an enhanced third pixel value of the pixel, which can improve the picture quality and the coding and decoding performance.

DETAILED DESCRIPTION OF THE EMBODIMENTS

Figure 1A:
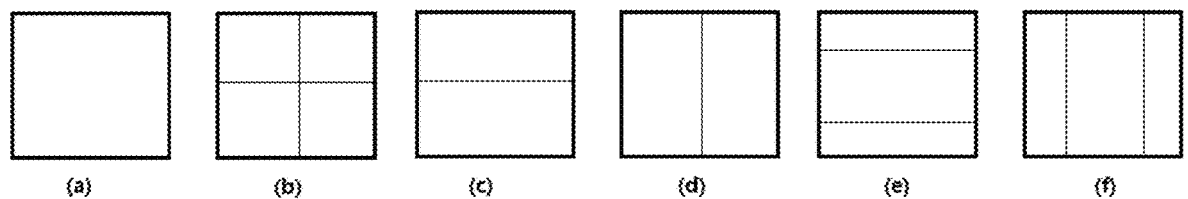
FIGS. 1A to 1B are schematic diagrams illustrating block partition according to an example embodiment of the present application.

Examples will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present application. Rather, they are merely examples of apparatuses and methods consistent with some aspects of the present application as detailed in the appended claims.

The terms used in the present application are for the purpose of describing particular examples only, and are not intended to limit the present application. Terms determined by "a", "the" and "said" in their singular forms in the present application and the appended claims are also intended to include plurality, unless clearly indicated otherwise in the context.

To enable a person skilled in the art to better understand the technical solutions provided by embodiments of the present application, some of technical terms involved in the embodiments of the present application and main processes of existing video coding and decoding are first briefly described below.

1. Technical Terms

1. Rate-Distortion Optimization (RDO). Indicators for evaluating coding efficiency may include bit rate and Peak Signal to Noise Ratio (PSNR). The smaller the bit rate is, the higher the compression rate is; and the higher the PSNR is, the better the quality of the reconstructed picture is. In a mode selection, a decision method is actually a comprehensive evaluation for both of them. For example, the cost corresponding to a mode can be calculated according to the following formula. J(mode)=D+$\lambda$*R, where D represents Distortion, usually measured by a Sum of Squared Errors (SSE), where SSE refers to a mean sum of square of differences between a reconstructed picture block and a source picture; $\lambda$ represents a Lagrangian multiplier; and R represents an actual number of bits needed for coding a picture block in this mode, including a total number of bits needed for coding mode information, motion information, residuals and the like. In the mode selection, if the RDO is used to make a comparative decision on coding modes, best coding performance can usually be guaranteed.
2. Sequence Parameter Set (SPS). In this set, there is flag bit(s) for determining whether certain tools (manners) are allowed to be used in the whole sequence. In a case that a flag bit indicates 1, a corresponding tool (manner) can be allowed to be enabled in the video sequence; otherwise, the tool (manner) cannot be enabled during the coding process for the sequence.
3. Picture Parameter Set (PPS). In this set, there is flag bit(s) for determining whether certain tools (manners) are allowed to be used in a certain picture. In a case that a flag bit indicates 1, the corresponding tool (manner) can be allowed to be enabled in the picture; otherwise, the tool (manner) cannot be enabled during the coding process for the picture.
4. Picture header, which indicates common information for a certain picture.
5. Slice header. A picture may contain one or more slices. In slice header information, there is flag bit(s) for determining whether certain tools (manners) are allowed to be used in a slice. In a case that a flag bit indicates 1, a corresponding tool (manner) is allowed to be enabled in the slice; otherwise, the tool (manner) cannot be enabled during the coding process for the slice.
6. SAO filtering is used to eliminate ringing effect. Ringing effect is a phenomenon that rippling artifact are generated in the vicinities of edges after decoding, which is due to quantization distortion of high-frequency alternating current coefficients. The larger the size of the transform block is, the more obvious the ringing effect is. A basic principle of SAO is to perform compensation for a reconstructed curve by adding negative value(s) to peak pixels thereof, and adding positive value(s) to trough pixels thereof. In SAO, a CTU is taken as the basic unit which may include two major types of compensation: Edge Offset (EO) and Band Offset (BO). In addition, parameter fusion technology is further introduced.
7. ALF filtering. An optimal filter for mean square is obtained by calculating according to an original signal and a distorted signal, i.e., the Wiener filter. An ALF filter is generally a 7×7 or 5×5 diamond shape filter.

II. Block Partitioning Technology in Existing Video Coding Standards

In High Efficiency Video Coding (HEVC), a Coding Tree Unit (CTU) can be recursively divided into Coding Units (CUs) using a quad-tree structure. In a leaf node, as in a CU level, whether to use intra coding or inter coding can be determined. A CU can be further divided into two or four Prediction Units (PUs), and the same prediction information is used in the same PU. When the prediction is completed and residual information is obtained, a CU can be further divided into a plurality of Transform Units (TUs) using the quad-tree structure. For example, the current picture block in the present application may be a PU.

Figure 1B:
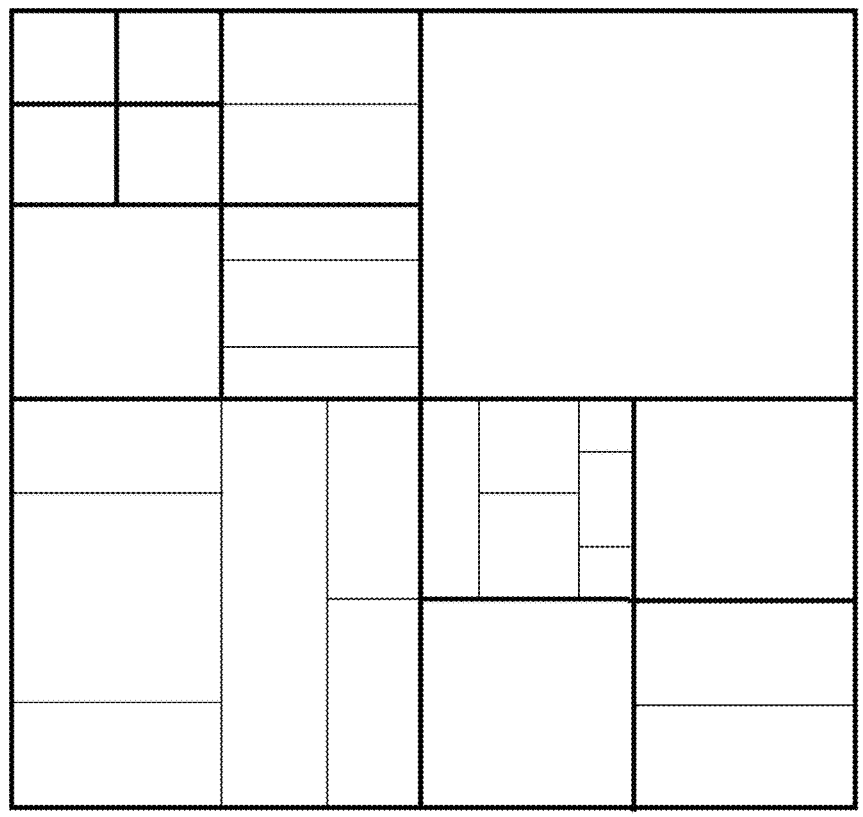

However, the block partitioning technology in newly proposed Versatile Video Coding (VVC) has changed significantly. The original division mode is replaced by a division structure that mixes binary tree/ternary tree/quad-tree. The new mixed division structure cancels the original distinction among concepts of CU, PU and TU, and supports a more flexible way of CU division. A CU may be divided into squares or rectangles. For a CTU, quad-tree division can be performed first, and binary tree and ternary tree division can be further performed on leaf nodes obtained from the quad-tree division. Referring to FIG. 1A, there are five division types for the CU shown in part (a), namely quad-tree division shown in part (b), horizontal binary tree division shown in part (c), vertical binary tree division shown in part (d), horizontal ternary tree division shown in part (e) and vertical ternary tree division shown in part (f). As shown in FIG. 1B, CU division within a CTU may be any combination of the above five division types. As can be seen from the above, shapes of PUs varies from division way to division way, for example, rectangles and squares of different sizes.

III. Main Flow of Existing Video Coding and Decoding

Figure 2:
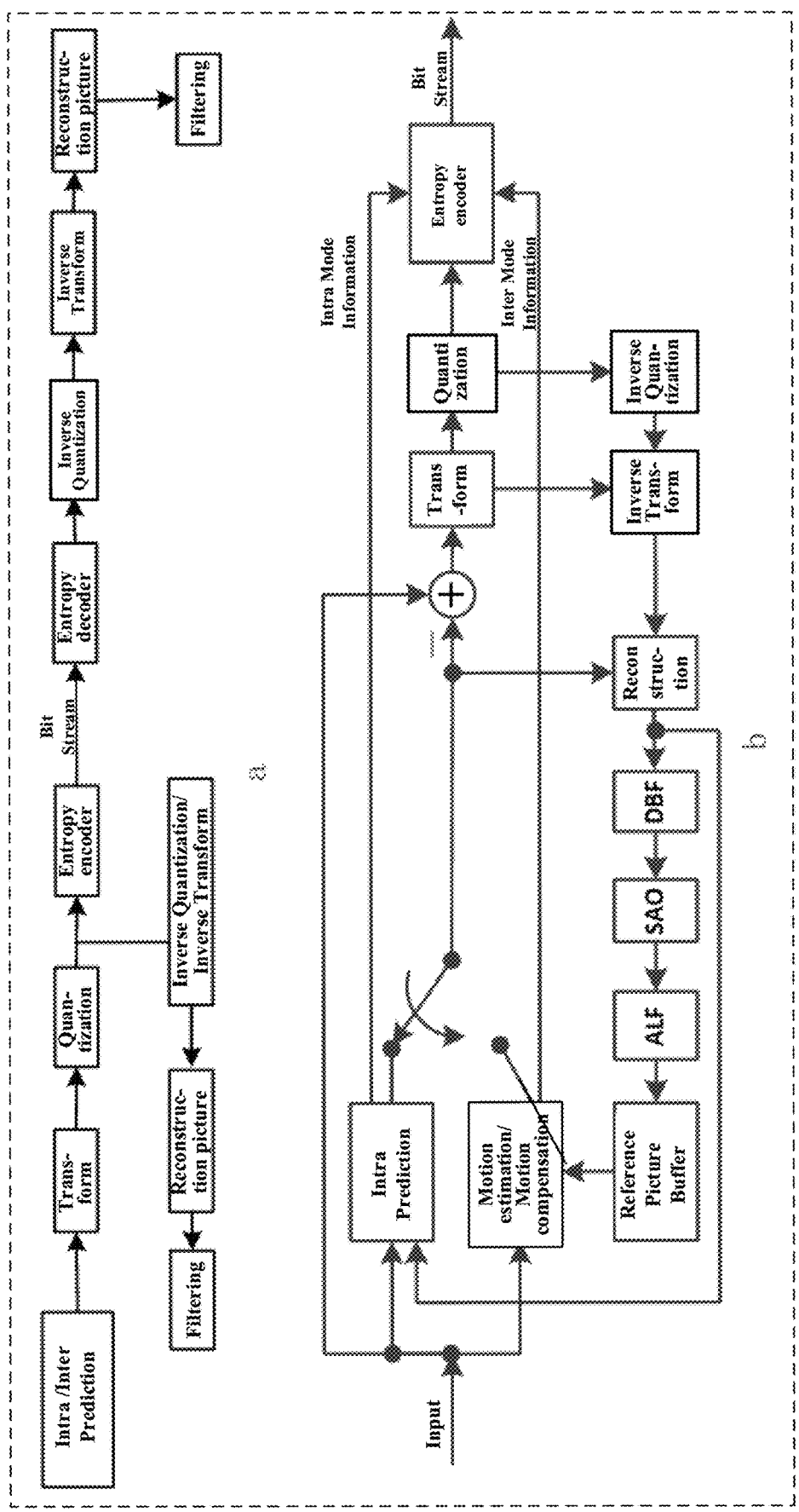
FIG. 2 is a schematic diagram illustrating a coding and decoding method according to an example embodiment of the present application.

Please refer to part a in FIG. 2 in which video coding is taken as an example, the video coding may include processes such as prediction, transform, quantization, entropy coding and so on. Further, the coding process may be performed according to the framework of part b in FIG. 2 as well.

Prediction can be classified into intra prediction and inter prediction. Intra prediction uses surrounding coded block(s) as a reference to predict a current uncoded block, so as to remove spatial redundancy effectively. Inter prediction uses neighboring coded picture(s) to predict a current picture, so as to remove temporal redundancy effectively.

Transform refers to transforming a picture from a spatial domain to a transform domain, and representing the picture with transform coefficient(s). Most pictures contain many flat areas and slowly changing areas. With appropriate transform, a picture can be transformed from a dispersed distribution in the spatial domain to a relatively concentrated distribution in the transform domain, which can remove a frequency domain correlation between signals, and effectively compress a bit stream together with a quantization process.

Entropy coding indicates a lossless coding manner that can convert a series of element signs into a binary bit stream for transmission or storage. The input signs may include quantized transform coefficient(s), motion vector information, prediction mode information, syntax related to the transform and the quantization and so on. Entropy coding can effectively remove the redundancy of element signs for a video.

The above is description with coding as an example. Processes of video decoding and video coding are relative, that is, the video decoding usually may include entropy decoding, prediction, inverse quantization, inverse transform, filtering and other processes. Implementation principles of these processes can be the same or similar to that of video coding.

Implementation of DBF filtering is briefly described below.

The DBF filtering includes two processes: a filtering decision and a filtering operation.

The filtering decision can include: 1) obtaining Boundary Strength (that is, obtaining a value of BS); 2) filtering on/off decision; and 3) strong and weak filtering selection. For a chroma component, only step 1) is performed, and a BS value of a luminance component is directly reused. For the chroma component, the filtering operation is performed when the BS value is 2 (that is, at least one of blocks on both sides of the current block uses an intra mode).

The filtering operation can include: 1) strong and weak filtering for a luminance component; and 2) filtering for a chroma component. The DBF filtering generally indicates performing horizontal boundary filtering (which can be called horizontal DBF filtering) and vertical boundary filtering (which can be called vertical DBF filtering) in units of 8*8, and at most 3 pixels on either side of a boundary are filtered while at most 4 pixels on either side of the boundary are used for filtering. Therefore, the horizontal/vertical DBF filtering for different blocks does not affect each other and can be performed in parallel.

Figure 3:
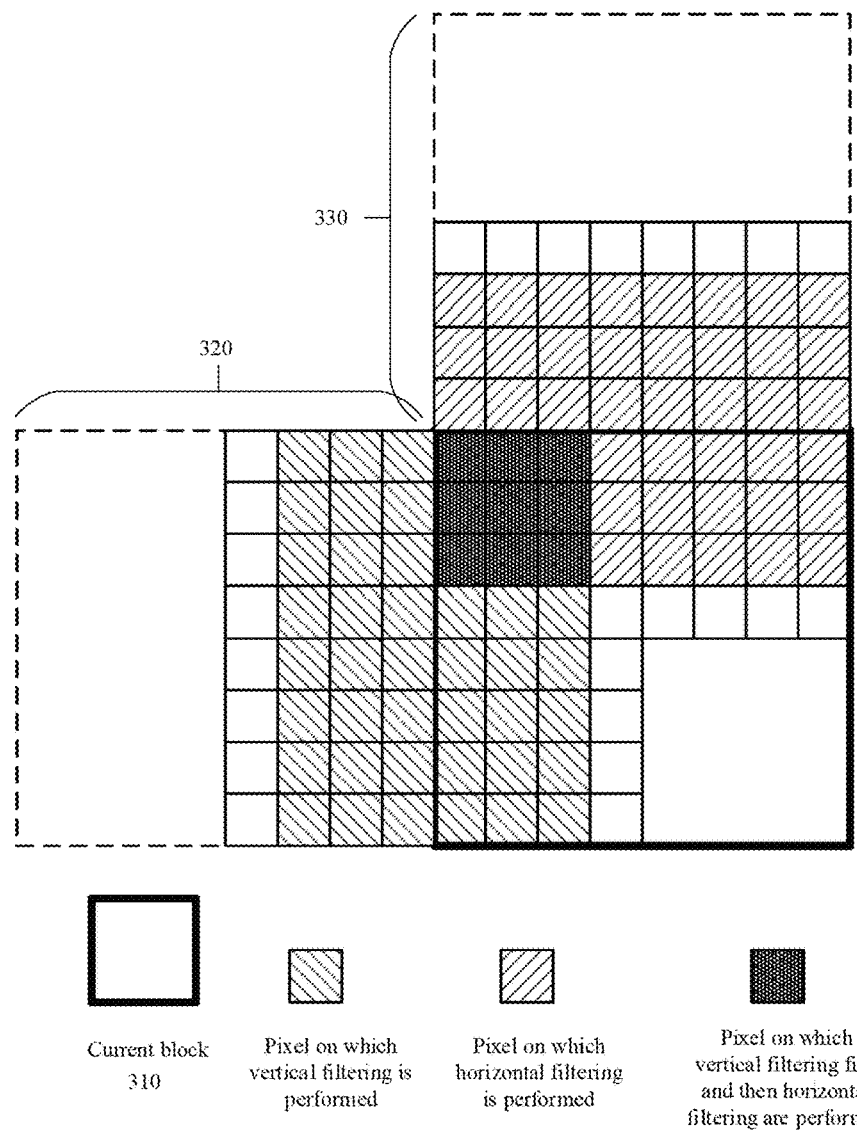
FIG. 3 is a schematic diagram illustrating pixels for DBF filtering according to an example embodiment of the present application.

As shown in FIG. 3, for current block 310 (which is of e.g., 8*8), vertical DBF filtering can be performed first on pixels in the left 3 columns of current block 310 and the right 3 columns of left block 320, and horizontal DBF filtering can be performed on pixels in the upper 3 lines of current block 310 and the lower 3 lines of upper block 330.

For example, for a pixel on which both vertical DBF filtering and horizontal DBF filtering are to be performed, the vertical DBF filtering is usually performed first, and then the horizontal DBF filtering is performed.

For all of DBF filtering, SAO filtering and ALF filtering, classification is performed based on a pixel value of a current pixel, or a relationship between the pixel value of the current pixel and pixel values of surrounding pixels, and different filtering operations are performed based on different categories. The picture enhancement method proposed in the present application indicates a secondary filtering (herein referred to as enhancement filtering) manner based on filtering residual(s). A filtering residual refers to a difference between pixel values before and after filtering. For example, in a case that a reconstruction value before DBF filtering is Y1, and a pixel value after the DBF filtering is Y2, classification can be performed based on a result of Y2−Y1. A main benefit of classification based on filtering residual(s) is that some over-filtered or pseudo-filtered pixel values can be specially enhanced, so as to bring pixels of these categories closer to original values. Over-filtering means that Y2 is much larger (or much smaller) than Y1, so that Y2 is much larger (or much smaller) than an original pixel value. Pseudo-filtering means that Y2−Y1 equals to 0 or closes to 0, and these pixel values remain unchanged after filtering, which can be equivalent to no filtering.

In the present application, it is supposed that a pixel's coordinates can be expressed as (i, j), the pixel has a reconstruction value as Y1 before performing first filtering (the first filtering includes DBF filtering, SAO filtering, ALF filtering and other filtering ways that do not use a filtering residual), and a pixel value as Y2 after the filtering, and then residual classification can be performed based on a result of Y2−Y1. According to the residual classification result, enhancement can be performed to obtain Y3. Y3 may be obtained by enhancing Y2, or by performing enhancement based on Y1, or by performing enhancement based on Y1 and Y2. The enhancement can be either adding a compensation value (which can be a positive number or a negative number), or performing a weighted filtering, for example, Y3=w1*Y1+w2*Y2, or Y3=w1*Y1+w2*Y2(i−1, j)+w2*Y2(i, j−1), where Y2(i−1, j) and Y2(i, j−1) indicate spatial neighboring pixel values related to Y2.

To make the above objects, features and advantages of the embodiments of the present application more clear and understandable, technical solutions in the embodiments of the present application will be described in further detail below with reference to the accompanying drawings.

Figure 4:
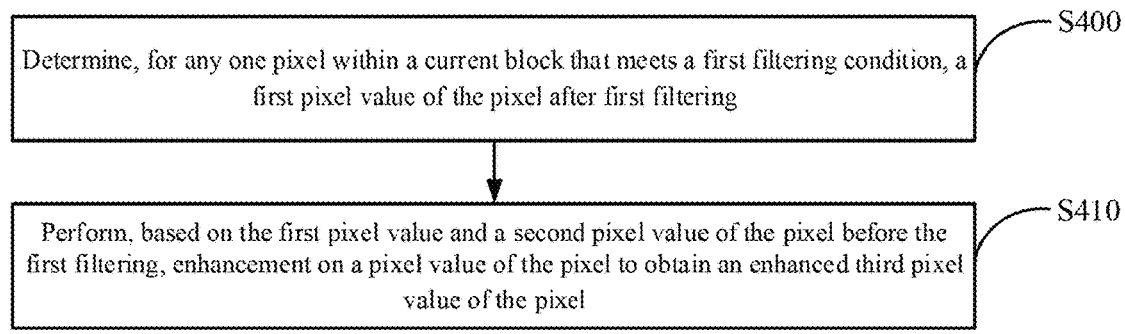
FIG. 4 is a schematic flowchart illustrating a picture enhancement method according to an example embodiment of the present application.

Please refer to FIG. 4, which is a schematic flowchart illustrating a picture enhancement method provided by an embodiment of the present application. As shown in FIG. 4, the picture enhancement method may include the following steps.

At step S400, for any one pixel within a current block that meets a first filtering condition, a first pixel value of the pixel after first filtering is determined.

In embodiments of the present application, the first filtering may include, but is not limited to, vertical DBF filtering, horizontal DBF filtering, SAO filtering, ALF filtering and the like.

Taking that the first filtering is the vertical DBF filtering or the horizontal DBF filtering as an example, whether each pixel of the current block meets the first filtering condition can be determined based on a position of the pixel in the current block and the filtering decision strategy of the DBF filtering above. For example, when it is determined that DBF filtering is to be performed on the current block according to the above filtering strategy of the DBF filtering, pixels in the current block on which vertical DBF filtering and/or horizontal DBF filtering are to be performed may be that shown in FIG. 3.

For any one pixel in the current block that meets the first filtering condition, a pixel value (herein referred to as a first pixel value) of the pixel after the first filtering can be determined.

At step S410, based on the first pixel value and a second pixel value of the pixel before the first filtering, enhancement is performed on a pixel value of the pixel to obtain an enhanced third pixel value of the pixel.

In the embodiments of the present application, when the first pixel value of the pixel after the first filtering is determined, based on the first pixel value and a pixel value (herein referred to as a second pixel value) of the pixel before the first filtering, a pixel value of the pixel can be enhanced, that is, enhancement filtering can be performed on the pixel value of the pixel to obtain a pixel value of the pixel after the enhancement (herein referred to as a third pixel value). In this way, the enhanced pixel value of the pixel is closer to an original pixel value than the first pixel value, so as to avoid the filtered pixel value from being much larger or smaller than the original pixel value due to over-filtering, and improve the picture quality.

For example, the third pixel value is closer to the original pixel value of the pixel than the first pixel value, so as to prevent the filtered pixel value from being much larger or smaller than the original pixel value of the pixel due to over-filtering.

For example, the enhancement process on a pixel value of a pixel can be implemented by adding a compensation value (also called an offset, which can be a positive number or a negative number), or by performing a weighted filtering.

Taking the weighted filtering as an example, assuming that coordinates of the pixel is (i, j), the first pixel value is Y2, the second pixel value is Y1 and the third pixel value is Y3, and then, Y3=w1*Y1+w2*Y2 or Y3=w1*Y2+w2*Y2 (i−1, j)+w2*Y2(i, j−1), where Y2(i−1, j) and Y2(i, j−1) indicate pixel values of spatial neighbouring pixels of the pixel.

As can be seen from the method flow shown in FIG. 4, when a pixel is filtered, a pixel value of the pixel can be enhanced based on pixel values of the pixel before and after the filtering, such that the coding and decoding performance as well as the picture quality can be improved.

In a possible embodiment, in step S410, based on the first pixel value and the second pixel value of the pixel before the first filtering, performing enhancement on the pixel value of the pixel may include: based on a difference between the first pixel value and the second pixel value, performing enhancement on the pixel value of the pixel.

For example, a residual of pixel values before and after filtering a pixel can usually represent a residual between a pixel value of the pixel after the filtering and an original pixel value of the pixel. Therefore, a pixel can be enhanced based on a residual of pixel values of the pixel before and after filtering, which can effectively ensure that an enhanced pixel value of the pixel is closer to the original pixel value of the pixel as well as improve the picture quality.

When the first pixel value obtained from performing the first filtering on the pixel is determined, a difference between the first pixel value and the second pixel value before performing the first filtering on the pixel can be calculated, and enhancement can be performed on a pixel value of the pixel based on the difference.

In an example, performing enhancement on the pixel value of the pixel based on the difference between the first pixel value and the second pixel value may include: based on a result of comparing a predetermined threshold with the difference between the first pixel value and the second pixel value, performing enhancement on the pixel value of the pixel.

For example, classification can be performed on the pixel based on the result of comparing the predetermined threshold with the difference between the first pixel value and the second pixel value of the pixel. Enhancement can be performed on the pixel value of the pixel based on a category of the pixel. For example, for pixels of different categories, strategies for enhancement varies from category to category.

In an example, based on the comparison result of the predetermined thresholds and the difference between the first pixel value and the second pixel value, performing enhancement on the pixel value of the pixel may include: in a case that the difference between the first pixel value and the second pixel value is greater than a first enhancement filtering threshold, performing enhancement on the pixel value of the pixel based on a first enhancement filtering offset; and in a case that the difference between the first pixel value and the second pixel value is smaller than a second enhancement filtering threshold, performing enhancement on the pixel value of the pixel based on a second enhancement filtering offset. The second enhancement filtering threshold is smaller than the first enhancement filtering threshold.

For example, the predetermined thresholds may include the first enhancement filtering threshold and the second enhancement filtering threshold, where the second enhancement filtering threshold is smaller than the first enhancement filtering threshold.

When the difference between the first pixel value and the second pixel value is determined, the difference may be compared with the first enhancement filtering threshold and the second enhancement filtering threshold. In response to determining that the difference is greater than the first enhancement filtering threshold, enhancement may be performed on the pixel value of the pixel based on the first enhancement filtering offset. In response to determining that the difference is smaller than the second enhancement filtering threshold, enhancement may be performed on the pixel value of the pixel based on the second enhancement filtering offset.

For example, for enhancing the pixel value of the pixel, a fourth pixel value can be determined based on the first pixel value and the second pixel value. In response to determining that the difference between the first pixel value and the second pixel value is greater than the first enhancement filtering threshold, a third pixel value can be obtained by performing enhancement on the fourth pixel value based on the first enhancement filtering offset. In response to determining that the difference between the first pixel value and the second pixel value is smaller than the second enhancement filtering threshold, the third pixel value can be obtained by performing enhancement on the fourth pixel value based on the second enhancement filtering offset.

For another example, the enhancement on the pixel value of the pixel may be implemented through performing enhancement on the first pixel value. In response to determining that the difference between the first pixel value and the second pixel value is greater than the first enhancement filtering threshold, the third pixel value can be obtained by performing enhancement on the first pixel value based on the first enhancement filtering offset. In response to determining that the difference between the first pixel value and the second pixel value is smaller than the second enhancement filtering threshold, the third pixel value can be obtained by performing enhancement on the first pixel value based on the second enhancement filtering offset.

It should be noted that, in the embodiments of the present application, in a case that the difference between the first pixel value and the second pixel value is smaller than or equal to the first enhancement filtering threshold, and greater than or equal to the second enhancement filtering threshold, the first pixel value may be taken as the third pixel value, or filtering (herein referred to as second filtering) can be performed on the first pixel value to obtain the third pixel value.

For example, a sum of the first pixel value and a predetermined third enhancement filtering offset may be determined as the third pixel value. For another example, the second filtering may be ALF filtering, and the third pixel value may be obtained by performing the ALF filtering on the first pixel value.

A pixel value of a pixel is within a specified value range, the value range is usually determined by a picture bit depth, for example, $[0, 2^D-1]$, where D is the picture bit depth. For example, for an 8-bit picture, the value range is [0, 255], and for a 10-bit picture, the value range is 10, 10231. To avoid that the enhanced third pixel value of the pixel exceeds the value range of pixel value, when the third pixel value is obtained, a clip operation can be performed to limit the third pixel value to a predetermined value range.

In response to determining that the third pixel value is greater than an upper limit of the predetermined value range, the third pixel value is set to the upper limit of the predetermined value range; and in response to determining that the third pixel value is smaller than a lower limit of the predetermined value range, the third pixel value is set to the lower limit of the predetermined value range. Taking an 8-bit picture as an example, in a case that the third pixel value is smaller than 0, the third pixel value can be set to 0, and in a case that the third pixel value is greater than 255, the third pixel value can be set to 255.

When a coder-side device performs the above enhancement on a pixel in the current block, the coder-side device and a decoder-side device should be consistent in values of the enhancement filtering thresholds and the enhancement filtering offsets.

For example, the coder-side device and the decoder-side device can construct the same enhancement filtering threshold candidate list (hereinafter referred to as a threshold candidate list) and the same enhancement filtering offset candidate list. The coder-side device can carry an enhancement filtering threshold index (hereinafter referred to as a threshold index) and an enhancement filtering offset index (hereinafter referred to as an offset index) in a bit stream. The threshold index can be used to represent a position of an enhancement filtering threshold, for example, the first enhancement filtering threshold or the second enhancement filtering threshold, in the threshold candidate list. The offset index can be used to represent a position of an enhancement filtering offset, for example, the first enhancement filtering offset or the second enhancement filtering offset, in the offset candidate list.

When the bit stream is received, the decoder-side device can decode the threshold index and the offset index from the bit stream, query the first enhancement filtering threshold or the second enhancement filtering threshold from the threshold candidate list based on the threshold index, and query the first enhancement filtering offset or the second enhancement filtering offset from the offset candidate list based on the offset index.

In one example, to reduce the number of bits consumed by threshold index(es) to be coded, the first enhancement filtering threshold can be the opposite of the second enhancement filtering threshold.

For example, since the second enhancement filtering threshold is smaller than the first enhancement filtering threshold, the first enhancement filtering threshold can be a positive number, and the second enhancement filtering threshold can be a negative number. For example, the first enhancement filtering threshold may be 2, and the second enhancement filtering threshold may be −2. Similarly, the first enhancement filtering offset can be the opposite of the second enhancement filtering offset.

It should be noted that, in the embodiments of the present application, while constructing the enhancement filtering threshold candidate list and the enhancement filtering offset candidate list, a form of parameter sets can be used. That is, each candidate value in a candidate list can indicate a parameter set, and the parameter set may include a candidate first enhancement filtering threshold and a candidate second enhancement filtering threshold (in a case that the first enhancement filtering threshold and the second enhancement filtering threshold are opposite numbers of each other, it can include only one of the two), a candidate first enhancement filtering offset and a candidate second enhancement filtering offset (in a case that the first enhancement filtering offset and the second enhancement filtering offset are opposite numbers of each other, it can include only one of the two).

While coding and decoding an index, the index can be coded and decoded in a form of a parameter set index, that is, a position of a parameter set in a parameter set candidate list can be represented with a parameter set index. Specific implementation thereof can be described in the following specific embodiments.

In addition, in the embodiments of the present application, enhancement filtering parameters of the current block, for example, an enhancement filtering threshold and an enhancement filtering offset, may reuse corresponding parameters of a surrounding block, for example, an upper block or a left block as well.

The coder and the decoder can use a flag bit in a bit stream for indicating whether the current block reuses enhancement filtering parameters of the surrounding block. In response to determining that the enhancement filtering parameters of the surrounding block are reused, there is no need to additionally code and decode the enhancement filtering parameters of the current block.

In another example, to reduce the number of bits consumed by threshold index(es) to be coded, the first enhancement filtering threshold and/or the second enhancement filtering threshold are fixed values. For example, the first enhancement filtering threshold and/or the second enhancement filtering threshold may be set to a fixed value, so that there is no need to code a threshold index corresponding to the first enhancement filtering threshold and/or a threshold index corresponding to the second enhancement filtering threshold. Similarly, the first enhancement filtering offset and/or the second enhancement filtering offset may be fixed values as well.

In another possible embodiment, in step S410, based on the first pixel value and the second pixel value of the pixel before the first filtering, performing enhancement on the pixel value of the pixel may include: determining the third pixel value by using machine learning or deep learning with the first pixel value and the second pixel value as input parameters.

For example, manners of the machine learning or deep learning can be further used to implement the enhancement on pixel values. When the first pixel value of the pixel is determined by performing the first filtering on the pixel, the first pixel value and the second pixel value before the first filtering can be taken as input parameters, and the machine learning or deep learning can be used to perform enhancement on the pixel value of the pixel, so as to obtain a third pixel value after enhancement.

It should be noted that the ways of determining the third pixel value described in the above-mentioned embodiments are several specific examples of implementations for determining the third pixel value in the embodiments of the present application, and do not limit the protection scope of the present application. In the embodiments of the present application, the third pixel value can also be determined based on the first pixel value and the second pixel value in other ways. For example, a difference between the first pixel value and the second pixel value can be taken as an input, and a Wiener filter can be used to determine the third pixel value. Alternately, based on the difference between the first pixel value and the second pixel value, classification can be performed on the second pixel value, and based on a category of the second pixel value, the Wiener filter can be used to perform enhancement on the pixel value of the pixel to determine the third pixel value.

In a possible embodiment, in step S410, based on the first pixel value and the second pixel value of the pixel before the first filtering, performing enhancement on the pixel value of the pixel may include: in a case that enhancement filtering is enabled for the current block, performing enhancement on the pixel value of the pixel based on the first pixel value and the second pixel value.

For example, to improve the flexibility and controllability of enhancement filtering, a scheme that enables or disables the enhancement filtering can be selected. That is, when a pixel is filtered, enhancement is performed on a pixel value of the pixel (enabling enhancement filtering) or enhancement is not performed on the pixel value of the pixel (disabling enhancement filtering).

For any one pixel within the current block that meets a first filtering condition, when a first pixel value of the pixel after first filtering is determined, based on whether enhancement filtering is enabled for the current block, whether to perform enhancement on a pixel value of the pixel can be determined. In a case that the enhancement filtering is enabled for the current block, the enhancement can be performed on the pixel based on the first pixel value and the second pixel value.

In one example, a designated syntax can be used to identify whether enhancement filtering is enabled for the current block. For example, a level of the designated syntax may include, but is not limited to, one or more of the following: a syntax at a Sequence Parameter Set (SPS) level, a syntax at a Picture Parameter Set (PPS) level, or a syntax at a Slice level. Alternately, the designated syntax may include, but is not limited to, one or more of the following: a syntax at the SPS level, a syntax at the PPS level, a syntax at a Coding Tree Unit (CTU) level, or a syntax at a Coding Unit (CU) level.

For example, to improve the flexibility and controllability of enhancement filtering, enabling or disabling the enhancement filtering may be implemented at different levels. For example, the enabling or disabling for the enhancement filtering can be realized at one or more of the SPS level, the PPS level and the Slice level. For example, in a case that enhancement filtering is enabled for a picture sequence, enabling or disabling for the enhancement filtering may be further set in the syntax at the PPS level, so that the enhancement filtering can be selectively enabled or disabled for each picture in the picture sequence. For another example, in a case that enhancement filtering is enabled for a picture, enabling or disabling for the enhancement filtering may be further set in the syntax at the Slice level, so that the enhancement filtering can be selectively enabled or disabled for each slice of the picture. It should be noted that, when the number of Slices included in a picture is 1, and enhancement filtering is enabled for the picture, enhancement filtering is enabled for this Slice as well, and vice versa.

Similarly, the enabling or disabling for the enhancement filtering can be realized at one or more of the SPS level, the PPS level, the CTU level and the CU level.

In one example, in a case that one or more candidate levels of the designated syntax include at least two levels, a level of the designated syntax is determined based on a predetermined flag bit, which is used to indicate the level of the designated syntax.

For example, in a case that the candidate levels of the designated syntax include at least two levels, a special flag bit can be further used to indicate a level of the above-mentioned designated syntax. For example, in a case that a level of the designated syntax includes the PPS level and the CTU level, a flag bit may be added at the PPS to indicate that the level of the designated syntax is the PPS level or the CTU level.

For example, a syntax level of the predetermined flag bit matches with a non-lowest level among candidate levels of the designated syntax. For example, in a case that the candidate levels of the designated syntax include the syntax at the SPS level and the syntax at the PPS level, the syntax level of the predetermined flag bit may be the SPS level. In a case that the candidate levels of the designated syntax include the syntax at the PPS level and the syntax at the Slice level, the syntax level of the predetermined flag bit may be the PPS level. In a case that the candidate levels of the designated syntax include the syntax at the SPS level, the syntax at the PPS level and the syntax at the Slice level, the predetermined flag bit may include a flag bit at the SPS level and a flag bit at the PPS level. In a case that the candidate levels of the designated syntax include the syntax at the PPS level and the syntax at the CTU level, the syntax level of the predetermined flag bit may be the PPS level. In a case that the candidate levels of the designated syntax include the syntax at the CTU level and the syntax at the CU level, the syntax level of the predetermined flag bit may be the CTU level. In a case that the candidate levels of the designated syntax include the syntax at the PPS level, the syntax at the CTU level and the syntax at the CU level, the predetermined flag bit may include a flag bit for the PPS level and a flag bit for the CTU level. For specific implementations, description would be provided below with reference to specific embodiments.

In a possible embodiment, in a case that the first filtering is a non-first filtering in a succession of filtering for the pixel, the second pixel value may be a pixel value obtained by performing enhancement on a pixel value of the pixel after previous filtering.

For example, in a case that a pixel is to be subjected to a number of consecutive filtering, when filtering is performed on the pixel each time, enhancement may be performed on a pixel value of the pixel. For a pixel on which next filtering is to be performed, a pixel value thereof can be a pixel value obtained from the previous filtering and enhancement.

In an example, the first filtering is horizontal DBF filtering, and in a case that the pixel meets a vertical DBF filtering condition, the second pixel value is a pixel value of the pixel obtained from performing enhancement on a fifth pixel value of the pixel. The fifth pixel value is a pixel value obtained from performing vertical DBF filtering on the pixel.

For example, in a case that the first filtering is the horizontal DBF filtering, the pixel meets the vertical DBF filtering condition, and a pixel value of the pixel obtained from performing the vertical DBF filtering is the fifth pixel value, the second pixel value is a pixel value obtained by performing vertical DBF filtering and then enhancement in ways described in the above embodiments on the pixel.

In a possible embodiment, the first filtering is vertical DBF filtering. In step S410, when the pixel value of the pixel has been performed the enhancement, the method may further include: in a case that the pixel meets a horizontal DBF filtering condition, horizontal DBF filtering is performed on the third pixel value to obtain a sixth pixel value of the pixel; and based on the third pixel value and the sixth pixel value, enhancement is performed on the pixel value of the pixel to obtain an enhanced seventh pixel value of the pixel.

For example, while vertical DBF filtering and enhancement are performed on a pixel in the manner described in steps S400 to S410, whether the pixel meets the horizontal DBF filtering condition can be further determined. For example, based on a position of the pixel, whether the pixel meets the horizontal DBF filtering condition can be determined.

In a case that the pixel meets the horizontal DBF filtering condition, horizontal DBF filtering can be performed on the third pixel value to obtain a pixel value of the pixel subjected to the horizontal DBF filtering (herein referred to as the sixth pixel value). Based on a pixel value of the pixel before the horizontal DBF filtering, that is, the third pixel value, and a pixel value of the pixel after the horizontal DBF filtering, that is, the sixth pixel value, enhancement can be performed on the pixel value of the pixel, so as to obtain a pixel value of the pixel after the enhancement (herein referred to as the seventh pixel value).

It should be noted that, for specific implementations of performing the enhancement on the pixel value of the pixel based on the third pixel value and the sixth pixel value, reference can made to related description of performing enhancement on the pixel value of the pixel based on the first pixel value and the second pixel value described in the above-mentioned embodiments, which will not be repeated in the embodiments of the present application.

In addition, in the embodiments of the present application, for the implementation flow of the above-mentioned succession of filtering, description is made with an example that enhancement filtering is enabled for each filtering performed on a pixel. In a case that the enhancement filtering is not enabled, enhancement may not be needed after corresponding filtering.

For example, the vertical DBF filtering and the horizontal DBF filtering may be taken as an example. In a case that a pixel meets a vertical DBF filtering condition and a horizontal DBF filtering condition, and enhancement filtering is not enabled for the vertical DBF filtering, when the vertical DBF filtering is performed on the pixel, it is not necessary to perform enhancement on a pixel value obtained from the vertical DBF filtering. In this case, while performing the horizontal DBF filtering on the pixel, a pixel value of the pixel before performing the horizontal DBF filtering can be a pixel value of the pixel on which the vertical DBF filtering is performed.

To make those skilled in the art better understand the technical solutions provided by the embodiments of the application, the technical solutions are described below in conjunction with specific examples. The technical solutions can be described by taking first filtering as DBF filtering, SAO filtering or ALF filtering as an example.

For example, a reconstruction value before the first filtering is Y1, and a pixel value after the first filtering is Y2, classification can be performed based on Y2−Y1 or Y1−Y2. Based on a result of the classification, for one of residuals of different categories, corresponding enhancement (also called enhancement filtering) can be performed to obtain an enhanced pixel value Y3.

For example, Y3 may be obtained by performing enhancement on Y2, or on Y1, or on Y1 and Y2 both. For example, the above enhancement may indicate adding a compensation value (which may be a positive number or a negative number), or performing a weighted filtering, for example, Y3=w1*Y1+w2*Y2, or Y3=w1*Y2+w2*Y2(i−1, j)+w2*Y2(i, j−1), where Y2(i−1, j) and Y2(i, j−1) indicate spatial neighboring pixel values related to Y2.

First, description is made by taking an example that the first filtering includes the DBF filtering.

Embodiment 1: pixel i meeting the vertical DBF filtering condition and the horizontal DBF filtering condition is taken as an example.

At step 1, by performing vertical DBF filtering on $Y_1(i)$, $Y_2(i)$ is obtained. At step 2, based on $Y_1(i)$ and $Y_2(i)$, enhancement is performed on a pixel value of the pixel to obtain $Y_3(i)$. At step 3, by performing horizontal DBF filtering on $Y_3(i)$, $Y_4(i)$ is obtained. At step 4, based on $Y_4(i)$ and $Y_3(i)$, enhancement is performed on a pixel value of the pixel to obtain $Y_5(i)$.

For example, in a case that the first filtering above is the vertical DBF filtering, $Y_1(i)$ may be the second pixel value above, $Y_2(i)$ may be the first pixel value above, and $Y_3(i)$ may be the third pixel value above. $Y_4(i)$ may be the sixth pixel value above, and $Y_5(i)$ may be the seventh pixel value above. For example, in a case that the first filtering above is the horizontal DBF filtering, $Y_3(i)$ may be the second pixel value above. $Y_4(i)$ may be the first pixel value above, $Y_5(i)$ may be the third pixel value above, and $Y_2(i)$ may be the fifth pixel value above.

Embodiment 2

On the basis of Embodiment 1, in step 2, it is assumed that $Y_v(i)=(Y_1(i)+Y_2(i)+1)/2$;

if $Y_1(i)-Y_2(i)>T_v$, $Y_3(i)=\text{clip}(Y_v(i)+f0_v)$;

if $Y_1(i)-Y_2(i)<NT_v$, $Y_3(i)=\text{clip}(Y_v(i)+f1_v)$; and if $NT_v \le Y_1(i)-Y_2(i) \le T_v$, $Y_3(i)=Y_2(i)$, or $Y_3(i)=Y_2(i)+f2_v$. $Y_3(i)=Y_2(i)+f2_v$ represents performing filtering (that is, the above-mentioned second filtering) on $Y_2(i)$ to obtain $Y_3(i)$.

For example, $T_v$ and $NT_v$ can be enhancement filtering thresholds, and $f0_v$, $f1_v$, and $f2_v$ can be enhancement filtering offsets. clip(x) can represent limiting x to a predetermined value range. For example, in a case that the first filtering is vertical BDF filtering, $T_v$ may be the first enhancement filtering threshold above, $NT_v$ may be the second enhancement filtering threshold above. $f0_v$ may be the first enhancement filtering offset above, $f1_v$ may be the second enhancement filtering offset above, $f2_v$ may be the third enhancement filtering offset above, $Y_v(i)$ may be the fourth pixel value above, and clip(x) may represent limiting x to the predetermined value range.

For example, $NT_v=-T_v$, that is, $T_v$ is an opposite number of $NT_v$.

Similarly, in step 4, it is assumed that $Y_h(i)=(Y_3(i)+Y_4(i)+1)/2$;

if $Y_3(i)-Y_4(i)>T_h$, $Y_3(i)=\text{clip}(Y_h(i)+f0_h)$;

if $Y_3(i)-Y_4(i)<NT_h$, $Y_3(i)=\text{clip}(Y_h(i)+f1_h)$; and if $NT_h \le Y_3(i)-Y_4(i) \le T_h$, $Y_5(i)=Y_4(i)$, or $Y_5(i)=Y_4(i)+f2_h$. $Y_5(i)=Y_4(i)+f2_h$ represents performing filtering (that is, the above-mentioned second filtering) on $Y_4(i)$ to obtain $Y_5(i)$.

For example, $T_h$ and $NT_h$ are enhancement filtering thresholds, and $f0_h$, $f1_h$ and $f2_h$ are enhancement filtering offsets.

For example, in a case that the first filtering is horizontal BDF filtering, $T_h$ may be the first enhancement filtering threshold above, $NT_h$ may be the second enhancement filtering threshold above. $f0_h$ may be the first enhancement filtering offset above, $f1_h$ may be the second enhancement filtering offset above, and $f2_h$ may be the third enhancement filtering offset above.

For example, $NT_h=-T_h$, that is, $NT_h$ is an opposite number of $T_h$.

Embodiment 3

On the basis of Embodiment 1, in step 2, it is assumed that $Y_v(i)=Y_2(i)$:
  if $Y_1(i)-Y_2(i)>T_v$, $Y_3(i)=\text{clip}(Y_v(i)+f0_v)$;
  if $Y_1(i)-Y_2(i)<NT_v$, $Y_3(i)=\text{clip}(Y_v(i)+f1_v)$; and
  if $NT_v \leq Y_1(i)-Y_2(i) \leq T_v$, $Y_3(i)=Y_2(i)$, or $Y_3(i)=Y_2(i)+f2_v$. $Y_3(i)=Y_2(i)+f2_v$ represents performing filtering (that is, the above-mentioned second filtering) on $Y_2(i)$ to obtain $Y_3(i)$.

For example, $T_v$ and $NT_v$ can be enhancement filtering thresholds, and $f0_v$, $f1_v$, and $f2_v$ can be enhancement filtering offsets. clip(x) can represent limiting x to a predetermined value range.

For example, $NT_v=-T_v$, that is, $T_v$ is an opposite number of $NT_v$.

Similarly, in step 4, it is assumed that $Y_h(i)=Y_4(i)$;
  if $Y_3(i)-Y_4(i)>T_h$, $Y_3(i)=\text{clip}(Y_h(i)+f0_h)$;
  if $Y_3(i)-Y_4(i)<NT_h$, $Y_3(i)=\text{clip}(Y_h(i)+f1_h)$; and
  if $NT_h \leq Y_3(i)-Y_4(i) \leq T_h$. $Y_5(i)=Y_4(i)$, or $Y_5(i)=Y_4(i)+f2_h$. $Y_5(i)=Y_4(i)+f2_h$ represents performing filtering (that is, the above-mentioned second filtering) on $Y_4(i)$ to obtain $Y_3(i)$.

For example, $T_h$ and $NT_h$ are enhancement filtering thresholds, and $f0_h$, $f1_h$ and $f2_h$ are enhancement filtering offsets. For example, $NT_h=-T_h$, that is, $T_h$ is an opposite number of $NT_h$.

Although the above-mentioned Embodiments 1 to 3 are described by taking pixel i meeting the vertical DBF filtering condition and the horizontal DBF filtering condition as an example, the method can also be applied to a case that pixel i meeting the vertical DBF filtering condition or the horizontal DBF filtering condition. For example, in the case that pixel i meets the vertical DBF filtering condition, the first two steps of the above-mentioned embodiments may be included. For example, in the case where pixel i meets the horizontal DBF filtering condition, two steps may be included, in which step 1 may include performing horizontal DBF filtering on $Y_1(i)$ to obtain $Y_2(i)$, and step 2 may include, based on $Y_1(i)$ and $Y_2(i)$, performing enhancement on the pixel value of the pixel to obtain $Y_3(i)$. For the specific implementation of step 2, reference can be made to the specific implementation of step 2 in Embodiments 2 and 3, in which parameters for the vertical DBF filtering are replaced with parameters for the horizontal DBF filtering, which will not be repeated here.

Embodiment 4

The solution described in Embodiment 2 or Embodiment 3 may be adopted at a picture level. The picture level may include the PPS level or the slice level, and the PPS level may indicate a picture. A picture may include N (N is a positive integer) slices.

For a coder-side device, the following syntax information is to be coded and transmitted in a picture header or slice header. That is, a set of the following syntax (a level of the syntax includes the PPS level or the slice level) is adopted for a picture or a slice, and all coded blocks within the picture or slice reuse the same set of coefficients.

For example, the set of coefficients may include: enhancement filtering threshold(s) (which may include a vertical enhancement filtering threshold and/or a horizontal enhancement filtering threshold) and enhancement filtering offset(s) (which may include a vertical enhancement filtering offset and/or a horizontal enhancement filtering offset).

For a decoder-side device, the following syntax information is to be decoded from the picture header or slice header.
  1. A vertical enhancement filtering enabling flag, which can be used to identify whether enhancement filtering for a vertical direction is enabled for a current picture or slice.

In a case of not being enabled, when the above step 1 is performed, there is no need to perform the above step 2, and no need to code or decode the related threshold index and offset index.

In a case of being enabled, when the above step 1 is performed, the above step 2 is to be performed, and the following information is coded and decoded: an enhancement filtering threshold index for the vertical direction and an enhancement filtering offset index for the vertical direction.

The enhancement filtering threshold index for the vertical direction can be of 1 bin, that is, there are two candidate thresholds. For example, an enhancement filtering threshold candidate list may be {1, 2} or {2, 4}, or may be other candidate lists including two candidate values.

For example, in a case that $T_v$ is an opposite number of $NT_v$, only one threshold index is to be coded. For example, in a case that the enhancement filtering thresholds are fixed values, for example, $T_v=2$ and $NT_v=-2$, there is no need to code and decode the threshold index.

For $f0_v$, and $f1_v$, candidate values of the enhancement filtering offset index for the vertical direction may be the same or different, and the offset index may be of 2 bins, that is, 4 candidate offsets are included. For example, an enhancement filtering offset candidate list may be {1, 2, 3, 4} or {2, 4, 6, 8}, or may be other candidate lists including 4 candidate values. For example, in a case that the enhancement filtering offset is a fixed value, there is no need to code the offset index. For example, candidate lists of ft. and f1, may be the same or different, for example, a candidate list of $f0_v$ may be {−1, −2, −3, −4}, and a candidate list of $f1_v$ may be {1, 2, 3, 4}.

2. A horizontal enhancement filtering enabling flag, which can be used to identify whether enhancement filtering for a horizontal direction is enabled for a current picture or slice.

In a case of not being enabled, when the above step 3 is performed, there is no need to perform the above step 4, and no need to code or decode the related threshold index and offset index.

In a case of being enabled, when the above step 3 is performed, the above step 4 is to be performed, and the following information is coded and decoded: an enhancement filtering threshold index for the horizontal direction and an enhancement filtering offset index for the horizontal direction.

The enhancement filtering threshold index for the horizontal direction can be of 1 bin, that is, there are two candidate thresholds. For example, an enhancement filtering threshold candidate list may be {1, 2} or {2, 4}, or may be other candidate lists including two candidate values.

For example, in a case that $T_h$ is an opposite number of $NT_h$, only one threshold index is to be coded. For example, in a case that the enhancement filtering thresholds are fixed values, for example, $T_h=2$ and $NT_h=-2$, there is no need to code and decode the threshold index.

For $f0_h$ and $f1_h$, candidate values of the enhancement filtering offset index for the horizontal direction may be the same or different, and the offset index may be of 2 bins, that is, 4 candidate offsets are included. For example, an enhancement filtering offset candidate list may be {1, 2, 3, 4} or {2, 4, 6, 8}, or may be other candidate lists including 4 candidate values. For example, in a case that the enhancement filtering offset is a fixed value, there is no need to code the offset index. For example, candidate lists of $f0_h$ and $f1_h$ may be the same or different, for example, a candidate list of $f0_h$, may be {−1, −2, −3, −4}, and a candidate list of $f1_h$ may be {1, 2, 3, 4}.

Embodiment 5

Different from Embodiment 4, in Embodiment 5, the enhancement filtering parameters (including the enhancement filtering threshold and/or the enhancement filtering offset) appear in a form of a parameter set. That is, index information on the enhancement filtering threshold and/or the enhancement filtering offset is no longer separately coded and decoded, but index information on a parameter set including the enhancement filtering threshold and the enhancement filtering offset is coded and decoded.

The solution described in Embodiment 2 or Embodiment 3 may be adopted at a picture level. The picture level may include the PPS level or the slice level, and the PPS level may indicate a picture. A picture may include N (N is a positive integer) slices.

For a coder-side device, the following syntax information is to be coded and transmitted in a picture header or slice header. That is, a set of the following syntax (a level of the syntax includes the PPS level or the slice level) is adopted for a picture or a slice, and the same set of coefficients is used by all coded blocks within the picture or slice.

For example, the set of coefficients may include an enhancement filtering parameter set including enhancement filtering threshold(s) and enhancement filtering offset(s). For a decoder-side device, the following syntax information is to be decoded from the picture header or slice header.

1. A vertical enhancement filtering enabling flag, which can be used to identify whether enhancement filtering for a vertical direction is enabled for a current picture or slice.

In a case of not being enabled, when the above step 1 is performed, there is no need to perform the above step 2, and no need to code or decode the related parameter index.

In a case of being enabled, when the above step 1 is performed, the above step 2 is to be performed, and the following information is coded and decoded: an index of one or more vertical enhancement filtering parameters.

The vertical enhancement filtering parameters may appear in a form of a parameter set, and the index of the vertical enhancement filtering parameters may include, but is not limited to, an index of $\{T_v, f0_v, f1_v\}$ in a parameter set candidate list $T\{T_v, f0_v, f1_v\}$. As such, based on the index, values of $T_v$, $f0_v$, and $f1_v$ can be determined from the parameter set candidate list T.

For example, the vertical enhancement filtering parameters may be a fixed parameter set predetermined by the coder-side device and the decoder-side device, or may be stored vertical enhancement filtering parameter(s) of other coded pictures in the time domain. In this case, coding and decoding for the parameter index may not be needed.

2. A horizontal enhancement filtering enabling flag, which can be used to identify whether enhancement filtering for a horizontal direction is enabled for a current picture or slice.

In a case of not being enabled, when the above step 3 is performed, there is no need to perform the above step 4, and no need to code or decode the related parameter index.

In a case of being enabled, when the above step 3 is performed, the above step 4 is to be performed, and the following information is coded and decoded: an index of one or more horizontal enhancement filtering parameters.

The horizontal enhancement filtering parameters may appear in a form of a parameter set, and the index of the horizontal enhancement filtering parameters may include, but is not limited to, an index of $\{T_h, f0_h, f1_h\}$ in a parameter set candidate list $T\{T_h, f0_h, f1_h\}$. As such, based on the index, values of $T_h$, $f0_h$ and $f1_h$ can be determined from the parameter set candidate list T.

For example, the horizontal enhancement filtering parameters may be a fixed parameter set predetermined by the coder-side device and the decoder-side device, or may be stored horizontal enhancement filtering parameter(s) of other coded pictures in the time domain. In this case, there is no need to code and decode the parameter index.

Embodiment 6

The solution described in Embodiment 2 or Embodiment 3 may be adopted at a CTU level. A CTU is the largest coding unit. For an I slice (Intra slice), a size of CTU is generally 64*64, for a non-I slice (such as a B slice (bi-predictive slice) or a P slice (Predictive slice)), a size of CTU is generally 128*128.

For each CTU, a set of coefficients is coded, that is, each coding block under the CTU adopts the set of coefficients. For specific implementations of coding and decoding the coefficients for each CTU, reference can be made to specific implementations of coding and decoding corresponding coefficients in Embodiment 4 or Embodiment 5. For example, the set of coefficients may include enhancement filtering threshold(s) and enhancement filtering offset(s) (corresponding to Embodiment 4), or an enhancement filtering parameter set including the enhancement filtering threshold(s) and the enhancement filtering offset(s) (corresponding to Embodiment 5).

For example, for a decoder-side device, the following syntax information is to be decoded in a CTU header.

1. A vertical enhancement filtering enabling flag, which can be used to identify whether enhancement filtering for a vertical direction is enabled for a current picture or slice.

In a case of not being enabled, when the above step 1 is performed, there is no need to perform the above step 2, and no need to code or decode the related threshold index and offset index.

In a case of being enabled, when the above step 1 is performed, the above step 2 is to be performed, and the following information is coded and decoded: an enhancement filtering threshold index for the vertical direction and an enhancement filtering offset index for the vertical direction.

The enhancement filtering threshold index for the vertical direction can be of 1 bin, that is, there are two candidate thresholds. For example, an enhancement filtering threshold candidate list may be {1, 2} or {2, 4}, or may be other candidate lists including two candidate values.

For example, in a case that $T_v$ is an opposite number of $NT_v$, only one threshold index is to be coded. For example, in a case that the enhancement filtering thresholds are fixed values, for example, $T_v=2$ and $NT_v=-2$, there is no need to code and decode the threshold index.

For $f0_v$ and $f1_v$, candidate values of the enhancement filtering offset index for the vertical direction may be the same or different, and the offset index may be of 2 bins, that is, 4 candidate offsets are included. For example, an enhancement filtering offset candidate list may be {1, 2, 3, 4} or {2, 4, 6, 8}, or may be other candidate lists including 4 candidate values. For example, in a case that the enhancement filtering offset is a fixed value, there is no need to code the offset index. For example, candidate lists of $f0_v$ and $f1_v$ may be the same or different, for example, a candidate list of $f0_v$ may be {−1, −2, −3, −4}, and a candidate list of $f1_v$ may be {1, 2, 3, 4}.

2. A horizontal enhancement filtering enabling flag, which can be used to identify whether enhancement filtering for a horizontal direction is enabled for a current picture or slice.

In a case of not being enabled, when the above step 3 is performed, there is no need to perform the above step 4, and no need to code or decode the related threshold index and offset index.

In a case of being enabled, when the above step 3 is performed, the above step 4 is to be performed, and the following information is coded and decoded: an enhancement filtering threshold index for the horizontal direction and an enhancement filtering offset index for the horizontal direction.

The enhancement filtering threshold index for the horizontal direction can be of 1 bin, that is, there are two candidate thresholds. For example, an enhancement filtering threshold candidate list may be {1, 2} or {2, 4}, or may be other candidate lists including two candidate values.

For example, in a case that $T_h$ is an opposite number of $NT_h$, only one threshold index is to be coded. For example, in a case that the enhancement filtering thresholds are fixed values, for example, $T_h=2$ and $NT_h=-2$, there is no need to code and decode the threshold index.

For $f0_h$ and $f1_h$, candidate values of the enhancement filtering offset index for the horizontal direction may be the same or different, and the offset index may be of 2 bins, that is, 4 candidate offsets are included. For example, an enhancement filtering offset candidate list may be {1, 2, 3, 4} or {2, 4, 6, 8}, or may be other candidate lists including 4 candidate values. For example, in a case that the enhancement filtering offset is a fixed value, there is no need to code the offset index. For example, candidate lists of $f0_h$ and $f1_h$ may be the same or different, for example, a candidate list of $f0_h$ may be {−1, −2, −3, −4}, and a candidate list of $f1_h$ may be {1, 2, 3, 4}.

Embodiment 7

The solution described in Embodiment 2 or Embodiment 3 may be adopted at a CU level. A size of a CU is generally within a range from 4*4 to 128*128.

For each CU, a set of coefficients is coded, that is, each coding block under the CU adopts the set of coefficients. For specific implementations of coding and decoding the coefficients for each CU, reference can be made to specific implementations of coding and decoding corresponding coefficients in Embodiment 4 or Embodiment 5. For example, the set of coefficients may include enhancement filtering threshold(s) and enhancement filtering offset(s) (corresponding to Embodiment 4), or an enhancement filtering parameter set including the enhancement filtering threshold(s) and the enhancement filtering offset(s) (corresponding to Embodiment 5).

For example, for a decoder-side device, the following syntax information is to be decoded in each CU.

1. A vertical enhancement filtering enabling flag, which can be used to identify whether enhancement filtering for a vertical direction is enabled for a current picture or slice.

In a case of not being enabled, when the above step 1 is performed, there is no need to perform the above step 2, and no need to code or decode the related threshold index and offset index.

In a case of being enabled, when the above step 1 is performed, the above step 2 is to be performed, and the following information is coded and decoded: an enhancement filtering threshold index for the vertical direction and an enhancement filtering offset index for the vertical direction.

The enhancement filtering threshold index for the vertical direction can be of 1 bin, that is, there are two candidate thresholds. For example, an enhancement filtering threshold candidate list may be {1, 2} or {2, 4}, or may be other candidate lists including two candidate values.

For example, in a case that $T_v$ is an opposite number of $NT_v$, only one threshold index is to be coded. For example, in a case that the enhancement filtering thresholds are fixed values, for example, $T_v=2$ and $NT_v=-2$, there is no need to code and decode the threshold index.

For $f0_v$ and $f1_v$, candidate values of the enhancement filtering offset index for the vertical direction may be the same or different, and the offset index may be of 2 bins, that is, 4 candidate offsets are included. For example, an enhancement filtering offset candidate list may be {1, 2, 3, 4} or {2, 4, 6, 8}, or may be other candidate lists including 4 candidate values. For example, in a case that the enhancement filtering offset is a fixed value, there is no need to code the offset index. For example, candidate lists of $f0_v$ and $f1_v$ may be the same or different, for example, a candidate list of $f0_v$ may be {−1, −2, −3, −4}, and a candidate list of $f1$ may be {1, 2, 3, 4}.

2. A horizontal enhancement filtering enabling flag, which can be used to identify whether enhancement filtering for a horizontal direction is enabled for a current picture or slice.

In a case of not being enabled, when the above step 3 is performed, there is no need to perform the above step 4, and no need to code or decode the related threshold index and offset index.

In a case of being enabled, when the above step 3 is performed, the above step 4 is to be performed, and the following information is coded and decoded: an enhancement filtering threshold index for the horizontal direction and an enhancement filtering offset index for the horizontal direction.

The enhancement filtering threshold index for the horizontal direction can be of 1 bin, that is, there are two candidate thresholds. For example, an enhancement filtering threshold candidate list may be {1, 2} or {2, 4}, or may be other candidate lists including two candidate values.

For example, in a case that $T_h$ is an opposite number of $NT_h$, only one threshold index is to be coded. For example, in a case that the enhancement filtering thresholds are fixed values, for example, $T_h=2$ and $NT_h=-2$, there is no need to code and decode the threshold index.

For $f0_h$ and $f1_h$, candidate values of the enhancement filtering offset index for the horizontal direction may be the same or different, and the offset index may be of 2 bins, that is, 4 candidate offsets are included. For example, an enhancement filtering offset candidate list may be {1, 2, 3, 4} or {2, 4, 6, 8}, or may be other candidate lists including 4 candidate values. For example, in a case that the enhancement filtering offset is a fixed value, there is no need to code the offset index. For example, candidate lists of $f0_h$ and $f1_h$ may be the same or different, for example, a candidate list of $f0_h$ may be {−1, −2, −3, −4}, and a candidate list of $f1_h$ may be {1, 2, 3, 4}.

Embodiment 8

The solution described in Embodiment 2 or Embodiment 3 may be adopted at a CU level.

For each CU, a set of the following coefficients is coded and decoded.
1. a flag bit for whether to reuse enhancement filtering parameter(s) of a surrounding block.
1.1. In a case of reusing, enhancement filtering parameter(s) of a surrounding block, for example, a left block or an upper block, are reused.
1.2. In a case of not reusing, the following parameters are coded.
1.2.1. a vertical enhancement filtering enabling flag bit, which can be used to identify whether enhancement filtering for a vertical direction is enabled for a current CU.
1.2.1.1. In a case of being enabled, when the step 1 is performed, the above step 2 is to be performed, and the following information is coded and decoded.
1.2.1.1.1. An enhancement filtering threshold index for the vertical direction. The threshold index can be preferably of 1 bin, that is, there are two candidate thresholds. For example, an enhancement filtering threshold candidate list may be {1, 2} or {2, 4}, or may be other candidate lists including two candidate values. For example, in a case that $T_v$ is an opposite number of $NT_v$, only one threshold index is to be coded. For example, in a case that the enhancement filtering thresholds are fixed values, for example, $T_v=2$ and $NT_v=-2$, there is no need to code and decode the threshold index.
1.2.1.1.2. An enhancement filtering offset index for the vertical direction. Candidate values of $f0_v$ and $f1_v$ may be the same or different, and the offset index can be preferably of 2 bins, that is, 4 candidate offsets are included. For example, an enhancement filtering offset candidate list may be {1, 2, 3, 4} or {2, 4, 6, 8}, or may be other candidate lists including 4 candidate values. For example, in a case that the enhancement filtering offset is a fixed value, there is no need to code the offset index. For example, candidate lists of $f0_v$ and $f1_v$ may be the same or different, for example, a candidate list of $f0_v$ may be {−1, −2, −3, −4}, and a candidate list of $f1_v$ may be {1, 2, 3, 4}.
1.2.1.2. In a case of not being enabled, when the step 1 is performed, there is no need to perform the above step 2, and no need to code or decode the threshold index and the offset index in 1.2.1.1.1 and 1.2.1.1.2 respectively.
1.2.2. a horizontal enhancement filtering enabling flag, which can be used to identify whether enhancement filtering for a horizontal direction is enabled for the current CU.
1.2.2.1. In a case of being enabled, when the step 3 is performed, the above step 4 is to be performed, and the following information is coded and decoded.
1.2.2.1.1. An enhancement filtering threshold index for the horizontal direction. The threshold index can be preferably of 1 bin, that is, there are two candidate thresholds. For example, an enhancement filtering threshold candidate list may be {1, 2} or {2, 4}, or may be other candidate lists including two candidate values. For example, in a case that $T_h$ is an opposite number of $NT_h$, only one threshold index is to be coded. For example, in a case that the enhancement filtering thresholds are fixed values, for example, $T_h=2$ and $NT_h=-2$, there is no need to code and decode the threshold index.
1.2.2.1.2. An enhancement filtering offset index for the horizontal direction. Candidate values of $f0_h$ and $f1_h$ may be the same or different, and the offset index can be preferably of 2 bins, that is, 4 candidate offsets are included. For example, an enhancement filtering offset candidate list may be {1, 2, 3, 4} or {2, 4, 6, 8}, or may be other candidate lists including 4 candidate values. For example, in a case that the enhancement filtering offset is a fixed value, there is no need to code the offset index. For example, candidate lists of $f0_h$ and $f1_h$ may be the same or different, for example, a candidate list of $f0_h$ may be {−1, −2, −3, −4}, and a candidate list of $f1_h$ may be {1, 2, 3, 4}.
1.2.2.2. In a case of not being enabled, when the step 3 is performed, there is no need to perform the above step 4, and no need to code or decode the threshold index and the offset index in 1.2.2.1.1 and 1.2.2.1.2 respectively.

Embodiment 9

The solution described in Embodiment 2 or Embodiment 3 may be adopted at a picture level and a CTU level.

A flag bit (e.g., the above-mentioned predetermined flag bit) can be added at the picture level, and the flag bit can be used to indicate that a current picture adopts a syntax at the picture level or a syntax at the CTU level to enable enhancement filtering. A coder-side and a decoder-side can code and decode the flag bit at the picture level.

In a case that the current picture adopts the syntax at the picture level to enable enhancement filtering, specific implementations of coding and decoding coefficients for each picture can refer to Embodiment 4 or Embodiment 5.

In a case that the current picture adopts the syntax at the CTU level to enable enhancement filtering, specific implementations of coding and decoding coefficients for each CTU can refer to Embodiment 6.

Embodiment 10

The solution described in Embodiment 2 or Embodiment 3 may be adopted at a picture level, a CTU level and a CU level.

A flag bit can be added at the picture level, and the flag bit can be used to indicate that a current picture adopts a syntax at the picture level or a syntax at the CTU level to enable enhancement filtering. A coder-side and a decoder-side are to code and decode the flag bit at the picture level.

In a case that the current picture adopts the syntax at the picture level to enable enhancement filtering, specific implementations of coding and decoding coefficients for each picture can refer to Embodiment 4 or Embodiment 5.

In a case that the current picture adopts the syntax at the CTU level to enable enhancement filtering, a flag bit is to be added at the CTU level. The flag bit can be used to indicate that a current CTU adopts the syntax at the CTU level or a syntax at the CU level to enable enhancement filtering. A coder-side and a decoder-side can code and decode the flag bit at the CTU level.

In a case that the current picture adopts the syntax at the CTU level to enable enhancement filtering, specific implementations of coding and decoding coefficients for each CTU can refer to Embodiment 6.

In a case that the current picture adopts the syntax at the CU level to enable enhancement filtering, specific implementations of coding and decoding coefficients for each CU can refer to Embodiment 7 or Embodiment 8.

Next, the first filtering being SAO filtering is taken as an example for description.

Embodiment 11

At step 1, by performing SAO filtering on $Y_1(i)$, $Y_2(i)$ is obtained. At step 2, based on $Y_1(i)$ and $Y_2(i)$, enhancement is performed on a pixel value of a pixel to obtain $Y_3(i)$.

For example, in a case that the first filtering above is the SAO filtering, $Y_1(i)$ may be the second pixel value above. $Y_2(i)$ may be the first pixel value above, and $Y_3(i)$ may be the third pixel value above.

Embodiment 12

For the step 2 in Embodiment 11, the solution described in any one of Embodiments 2 to 10 may be adopted. It should be noted that Embodiments 2 to 10 are mainly described by taking performing two times of filtering as an example, while in the present embodiment, only one time of filtering is performed. As such, steps and parameters corresponding to each of the two times of filtering in the above embodiments can be replaced with steps and parameters corresponding to the filtering in the present embodiment.

Next, the first filtering being ALF filtering is taken as an example for description.

Embodiment 13

At step 1, by performing ALF filtering on $Y_1(i)$, $Y_2(i)$ is obtained. At step 2, based on $Y_1(i)$ and $Y_2(i)$, enhancement is performed on a pixel value of a pixel to obtain $Y_3(i)$.

For example, in a case that the first filtering above is the ALF filtering, $Y_1(i)$ may be the second pixel value above, $Y_2(i)$ may be the first pixel value above, and $Y_3(i)$ may be the third pixel value above.

Embodiment 14

For the step 2 in Embodiment 13, the solution described in any one of Embodiments 2 to 10 may be adopted. It should be noted that Embodiments 2 to 10 are mainly described by taking performing filtering twice as an example, while in the present embodiment, only one time of filtering is performed. As such, steps and parameters corresponding to each of the two filtering in the above embodiments can be replaced with steps and parameters corresponding to the filtering in the present embodiment.

At last, the first filtering being any filtering is taken as an example for description.

Embodiment 15

At step 1, by performing filtering on $Y_1(i)$, $Y_2(i)$ is obtained. At step 2, based on $Y_1(i)$ and $Y_2(i)$, enhancement is performed on a pixel value of a pixel to obtain $Y_3(i)$.

For example, in a case that the first filtering above is the filtering in step 1, $Y_1(i)$ may be the second pixel value above. $Y_2(i)$ may be the first pixel value above, and $Y_3(i)$ may be the third pixel value above.

Embodiment 16

For the step 2 in Embodiment 15, the solution described in any one of Embodiments 2 to 10 may be adopted. It should be noted that Embodiments 2 to 10 are mainly described by taking performing two times of filtering as an example, while in the present embodiment, only one time of filtering is performed. As such, steps and parameters corresponding to each of the two times of filtering in the above embodiments can be replaced with steps and parameters corresponding to the filtering in the present embodiment.

Embodiment 17

In the step 2 of Embodiment 15, by using machine learning or deep learning with $Y_1(i)$ and $Y_2(i)$ as inputs, $Y_3(i)$ can be determined.

Embodiment 18

In the step 2 of Embodiment 15, by using a Wiener filter with $Y_1(i)-Y_2(i)$ or $Y_2(i)-Y_1(i)$ as an input, $Y_3(i)$ can be determined. The Wiener filter may be as follows.

$$Y_3(i) = \sum_{j=0}^{K} w_j Y_2(j)$$

The filter can represent performing weighted summation on $Y_2(i)$ and one or more neighbouring pixels to obtain $Y_3(i)$, where K is a positive integer, indicating the number of pixels used for filtering (including the current pixel and the neighbouring pixels).

Embodiment 19

In the step 2 of Embodiment 15, classification can be performed on $Y_2(i)$ based on a value of $Y_1(i)-Y_2(i)$ or $Y_2(i)-Y_1(i)$. For different categories of $Y_2(i)$, different Wiener filters may be used to determine $Y_3(i)$.

For example, based on the size of $Y_1(i)-Y_2(i)$ or $Y_2(i)-Y_1(i)$, and one or more determined segmentation thresholds, a segment where $Y_1(i)-Y_2(i)$ or $Y_2(i)-Y_1(i)$ is located can be determined. The category of $Y_2(i)$ differs depending on the segment in which $Y_1(i)-Y_2(i)$ or $Y_2(i)-Y_1(i)$ is located.

Embodiment 20

A flag bit at a SPS level is decoded or coded, where the flag bit can be used to control whether all pictures in a current picture sequence use the technology described above. The technology includes implementations of the enhancement filtering technology described in any one of Embodiments 1 to 19. For example, in a case that the flag bit decoded by a decoder-side device represents adopting the above technology, the decoder-side device can process according to the enhancement filtering technology described in any one of Embodiments 1 to 19.

In the embodiments of the present application, for any one pixel, that meets a first filtering condition, in a current block, a first pixel value of the pixel after first filtering is determined. Based on the first pixel value and a second pixel value of the pixel before the first filtering, enhancement can be performed on a pixel value of the pixel to obtain an enhanced third pixel value of the pixel, which can improve the picture quality and the coding and decoding performance.

The methods provided by the present application are described above, and the following are descriptions of apparatuses provided by the present application.

Figure 5:
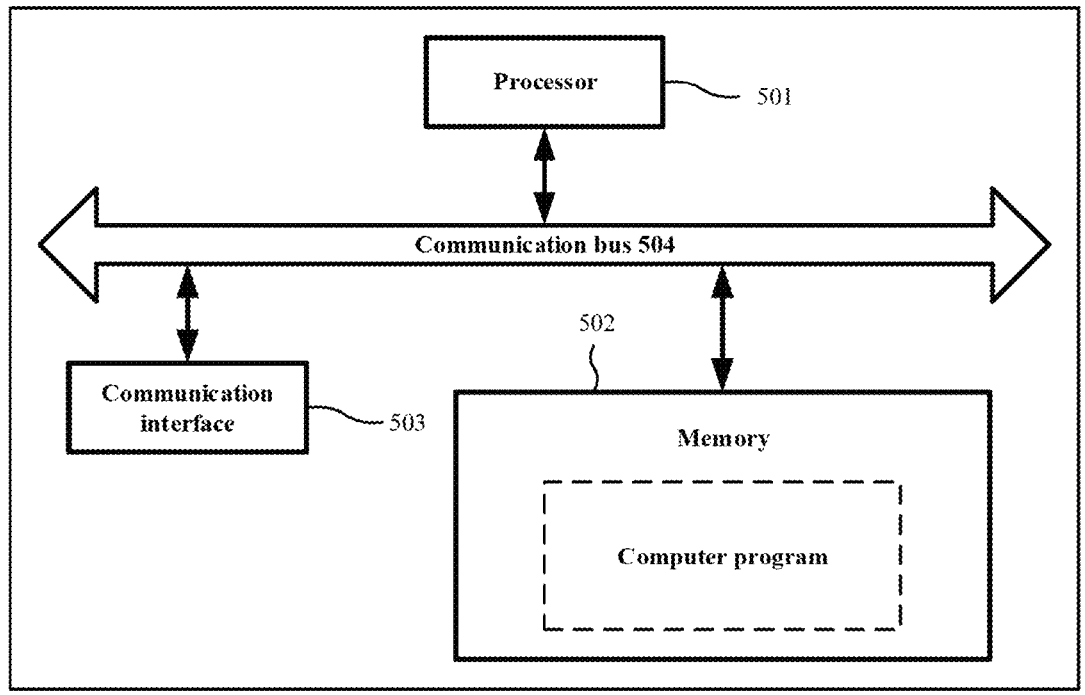
FIG. 5 is a hardware structural schematic diagram illustrating a picture enhancement apparatus according to an example embodiment of the present application.

Please refer to FIG. 5, which is a hardware structural schematic diagram illustrating a picture enhancement apparatus according to the embodiments of the present application. The picture enhancement apparatus may include a processor 501 and a memory 502 storing a computer program. The apparatus may further include a communication interface 503 and a communication bus 504. The processor 501, the memory 502 and the communication interface 503 can communicate with each other via the communication bus 504. By reading and executing a computer program corresponding to a picture enhancement control logic in memory 502, for example, machine executable instructions, the processor 501 can execute the picture enhancement methods described above.

The memory 502 referred herein may be any electronic, magnetic, optical, or other physical storage device that can contain or store information, such as executable instructions, data, and the like. For example, the memory may be: a Radom Access Memory (RAM), a transitory memory, a non-transitory memory, flash memory, storage drive (for example, hard disk drive), solid-state drive, any type of storage disk (such as an optical disc, DVD, etc.), or similar storage medium or a combination thereof.

Figure 6:
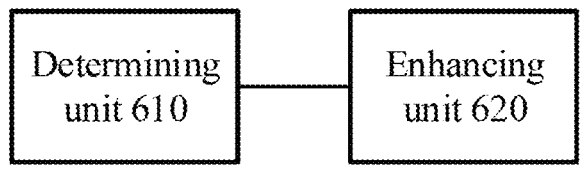
FIG. 6 is a functional structural schematic diagram illustrating a picture enhancement apparatus according to an example embodiment of the present application.

As shown in FIG. 6, functionally, the above picture enhancement apparatus may include; a determining unit 610, configured to determine, for any one pixel, that meets a first filtering condition, within a current block, a first pixel value of the pixel after first filtering; and an enhancing unit 620, configured to obtain an enhanced third pixel value of the pixel by performing, based on the first pixel value and a second pixel value of the pixel before the first filtering, enhancement on a pixel value of the pixel.

In a possible embodiment, the enhancing unit 620 is specifically configured to perform, based on a difference between the first pixel value and the second pixel value, the enhancement on the pixel value of the pixel.

In a possible embodiment, the enhancing unit 620 is specifically configured to perform, based on a result of comparing the difference with predetermined thresholds, the enhancement on the pixel value of the pixel.

In a possible embodiment, the enhancing unit 620 is specifically configured to perform, in a case that the difference is greater than a first enhancement filtering threshold, the enhancement on the pixel value of the pixel based on a first enhancement filtering offset; and perform, in a case that the difference is smaller than a second enhancement filtering threshold, the enhancement on the pixel value of the pixel based on a second enhancement filtering offset, where the second enhancement filtering threshold is smaller than the first enhancement filtering threshold.

In a possible embodiment, the enhancing unit 620 is specifically configured to determine, based on the first pixel value and the second pixel value, a fourth pixel value; and obtain the third pixel value by performing the enhancement on the fourth pixel value based on the first enhancement filtering offset.

In a possible embodiment, the enhancing unit 620 is specifically configured to obtain the third pixel value by performing the enhancement on the first pixel value based on the first enhancement filtering offset.

In a possible embodiment, the enhancing unit 620 is specifically configured to determine, based on the first pixel value and the second pixel value, a fourth pixel value; and obtain the third pixel value by performing the enhancement on the fourth pixel value based on the second enhancement filtering offset.

In a possible embodiment, the enhancing unit 620 is specifically configured to obtain the third pixel value by performing the enhancement on the first pixel value based on the second enhancement filtering offset.

In a possible embodiment, the enhancing unit 620 is further configured to determine, in a case that the difference is smaller than or equal to the first enhancement filtering threshold and greater than or equal to the second enhancement filtering threshold, the first pixel value as the third pixel value.

In a possible embodiment, the enhancing unit 620 is further configured to obtain, in a case that the difference is smaller than or equal to the first enhancement filtering threshold and greater than or equal to the second enhancement filtering threshold, the third pixel value by performing second filtering on the first pixel value.

In a possible embodiment, the first enhancement filtering threshold is an opposite number of the second enhancement filtering threshold; and/or the first enhancement filtering offset is an opposite number of the second enhancement filtering offset.

Figure 7:
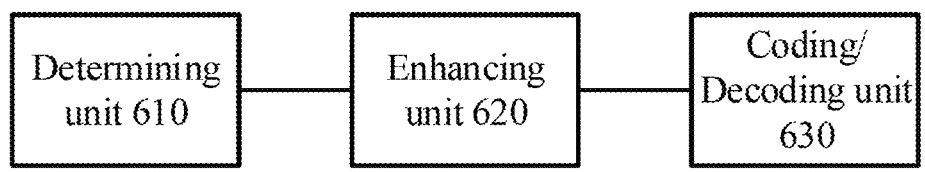
FIG. 7 is a functional structural schematic diagram illustrating another picture enhancement apparatus according to an example embodiment of the present application.

In a possible embodiment, as shown in FIG. 7, the apparatus further includes a coding/decoding unit 630 configured to code/decode a threshold index, where the threshold index represents a position of the first enhancement filtering threshold or the second enhancement filtering threshold in a threshold candidate list; and code/decode an offset index, where the offset index represents a position of the first enhancement filtering offset or the second enhancement filtering offset in an offset candidate list.

In a possible embodiment, at least one of the first enhancement filtering threshold or the second enhancement filtering threshold is a fixed value; or at least one of the first enhancement filtering offset or the second enhancement filtering offset is a fixed value.

In a possible embodiment, the enhancing unit 620 is further configured to set, in response to determining that the third pixel value is greater than an upper limit of a predetermined value range, the third pixel value to the upper limit of the predetermined value range; and set, in response to determining that the third pixel value is smaller than a lower limit of the predetermined value range, the third pixel value to the lower limit of the predetermined value range.

In a possible embodiment, the enhancing unit 620 is specifically configured to determine the third pixel value by using machine learning or deep learning with the first pixel value and the second pixel value as input parameters.

In a possible embodiment, the enhancing unit 620 is specifically configured to perform, in a case that enhancement filtering is enabled for the current block, the enhancement on the pixel value of the pixel based on the first pixel value and the second pixel value.

In a possible embodiment, whether the enhancement filtering is enabled for the current block is identified with a designated syntax, and the designated syntax includes at least one of: a syntax at a Sequence Parameter Set (SPS) level, a syntax at a Picture Parameter Set (PPS) level, or a syntax at a Slice level; or the designated syntax includes at least one of: a syntax at the SPS level, a syntax at the PPS level, a syntax at a Coding Tree Unit (CTU) level, or a syntax at a Coding Unit (CU) level.

In a possible embodiment, in a case that one or more candidate levels of the designated syntax include at least two levels, a level of the designated syntax is determined based on a predetermined flag bit, where the predetermined flag bit indicates the level of the designated syntax.

In a possible embodiment, a syntax level of the predetermined flag bit matches with a non-lowest level in the candidate levels of the designated syntax.

In a possible embodiment, in a case that the candidate levels of the designated syntax include the syntax at the SPS level and the syntax at the PPS level, the syntax level of the predetermined flag bit is the SPS level; in a case that the candidate levels of the designated syntax include the syntax at the PPS level and the syntax at the Slice level, the syntax level of the predetermined flag bit is the PPS level; in a case that the candidate levels of the designated syntax include the syntax at the SPS level, the syntax at the PPS level and the syntax at the Slice level, the predetermined flag bit includes a flag bit for the SPS level and a flag bit for the PPS level; in a case that the candidate levels of the designated syntax include the syntax at the PPS level and the syntax at the CTU level, the syntax level of the predetermined flag bit is the PPS level; in a case that the candidate levels of the designated syntax include the syntax at the CTU level and the syntax at the CU level, the syntax level of the predetermined flag bit is the CTU level; and in a case that the candidate levels of the designated syntax include the syntax at the PPS level, the syntax at the CTU level and the syntax at the CU level, the predetermined flag bit includes a flag bit for the PPS level and a flag bit for the CTU level.

In a possible embodiment, the first filtering includes vertical DeBlocking Filter (DBF) filtering, horizontal DBF filtering, Sample Adaptive Offset (SAO) filtering, or Adaptive Loop Filter (ALF) filtering.

In a possible embodiment, in a case that the first filtering is a non-first filtering in a succession of filtering for the pixel, the second pixel value is a pixel value obtained by performing enhancement on a pixel value of the pixel on which previous filtering is performed. The first filtering is horizontal DeBlocking Filter (DBF) filtering, in a case that the pixel meets a vertical DBF filtering condition, the second pixel value is a pixel value of the pixel obtained from performing enhancement on a fifth pixel value of the pixel, and the fifth pixel value is a pixel value obtained from performing vertical DBF filtering on the pixel.

In a possible embodiment, the first filtering is vertical DeBlocking Filter (DBF) filtering, and the enhancing unit is further configured to obtain, in a case that the pixel meets a horizontal DBF filtering condition, a sixth pixel value of the pixel by performing horizontal DBF filtering on the third pixel value; and obtain an enhanced seventh pixel value of the pixel by performing enhancement on the pixel value of the pixel based on the third pixel value and the sixth pixel value.

In some embodiments, the embodiments of the present application further provide a camera device, which can include the picture enhancement apparatus in any one of the above-mentioned embodiments. The apparatus may be applied in a coder device or a decoder device.

It should be noted that, in this context, relational terms such as "first" and "second" are used merely to distinguish one entity or operation from the other entity or operation, and do not necessarily require or imply the existence of any such actual relationship or order between these entities or operations. The terms "including", "including" or any other variants thereof are intended to cover non-exclusive inclusion, such that a process, method, article, or device including a series of elements includes not only those elements but also other elements not specifically listed, or further includes elements inherent to such process, method, article, or device. Under the circumstance of no more limitation, an element limited by the phrase "including a . . . " does not exclude the presence of additional equivalent elements in the process, method, article, or device that includes the element.

The above descriptions are preferred embodiments provided by the present application, which are not intended to limit the present application. Any modification, equivalent replacement, improvement, etc. made within the spirit and principle of the present application shall be included within the scope of the claims of the present application.

What is claimed is:

1. A picture enhancement method, comprising:
   determining, for a pixel within a current block that meets a first filtering condition, a first pixel value of the pixel after first filtering; and
   performing, based on the first pixel value and a second pixel value of the pixel before the first filtering, enhancement on a pixel value of the pixel to obtain an enhanced third pixel value of the pixel;
   wherein the performing, based on the first pixel value and the second pixel value of the pixel before the first filtering, the enhancement on the pixel value of the pixel comprises:
   performing, based on a difference between the first pixel value and the second pixel value, the enhancement on the pixel value of the pixel;
   wherein the performing, based on the difference between the first pixel value and the second pixel value, the enhancement on the pixel value of the pixel comprises:
   performing, based on a result of comparing the difference with predetermined thresholds, the enhancement on the pixel value of the pixel;
   wherein the performing, based on the result of comparing the difference with the predetermined thresholds, the enhancement on the pixel value of the pixel comprises:
   performing, in a case that the difference is greater than a first enhancement filtering threshold, the enhancement on the pixel value of the pixel based on a first enhancement filtering offset; and
   performing, in a case that the difference is smaller than a second enhancement filtering threshold, the enhancement on the pixel value of the pixel based on a second enhancement filtering offset,
   wherein the second enhancement filtering threshold is smaller than the first enhancement filtering threshold.

2. The method according to claim 1, wherein the performing the enhancement on the pixel value of the pixel based on the first enhancement filtering offset comprises:
   determining, based on the first pixel value and the second pixel value, a fourth pixel value; and
   performing the enhancement on the fourth pixel value based on the first enhancement filtering offset to obtain the third pixel value.

3. The method according to claim 1, wherein the performing the enhancement on the pixel value of the pixel based on the first enhancement filtering offset comprises:
   performing the enhancement on the first pixel value based on the first enhancement filtering offset to obtain the third pixel value.

4. The method according to claim 1, wherein the performing the enhancement on the pixel value of the pixel based on the second enhancement filtering offset comprises:

determining, based on the first pixel value and the second pixel value, a fourth pixel value; and performing the enhancement on the fourth pixel value based on the second enhancement filtering offset to obtain the third pixel value.

5. The method according to claim 1, wherein the performing the enhancement on the pixel value of the pixel based on the second enhancement filtering offset comprises:

performing the enhancement on the first pixel value based on the second enhancement filtering offset to obtain the third pixel value.

6. The method according to claim 1, wherein the performing, based on the result of comparing the difference with the predetermined thresholds, the enhancement on the pixel value of the pixel comprises:

determining, in a case that the difference is smaller than or equal to the first enhancement filtering threshold and greater than or equal to the second enhancement filtering threshold, the first pixel value as the third pixel value.

7. The method according to claim 1, further comprising: the first enhancement filtering threshold is an opposite number of the second enhancement filtering threshold.

8. The method according to claim 1, further comprising:
coding/decoding a threshold index, wherein the threshold index represents a position of the first enhancement filtering threshold or the second enhancement filtering threshold in a threshold candidate list; and coding/decoding an offset index, wherein the offset index represents a position of the first enhancement filtering offset or the second enhancement filtering offset in an offset candidate list.

9. The method according to claim 1, wherein the performing, based on the first pixel value and the second pixel value of the pixel before the first filtering, the enhancement on the pixel value of the pixel comprises:

determining the third pixel value by using machine learning or deep learning with the first pixel value and the second pixel value as input parameters.

10. The method according to claim 1, wherein the performing, based on the first pixel value and the second pixel value of the pixel before the first filtering, the enhancement on the pixel value of the pixel comprises:

performing, in a case that enhancement filtering is enabled for the current block, the enhancement on the pixel value of the pixel based on the first pixel value and the second pixel value.

11. The method according to claim 10, wherein whether the enhancement filtering is enabled for the current block is identified with a designated syntax, and a level of the designated syntax comprises at least one of a syntax at a Sequence Parameter Set (SPS) level, a syntax at a Picture Parameter Set (PPS) level, or a syntax at a Slice level; or the level of the designated syntax comprises at least one of a syntax at the SPS level, a syntax at the PPS level, a syntax at a Coding Tree Unit (CTU) level, or a syntax at a Coding Unit (CU) level.

12. The method according to claim 11, further comprising:

determining, in a case that one or more candidate levels of the designated syntax comprise at least two levels, a level of the designated syntax based on a predetermined flag bit which indicates the level of the designated syntax.

13. The method according to claim 12, wherein a syntax level of the predetermined flag bit matches with a non-lowest level in the candidate levels of the designated syntax.

14. The method according to claim 1, wherein the first filtering comprises at least one of vertical DeBlocking Filter (DBF) filtering, horizontal DBF filtering, Sample Adaptive Offset (SAO) filtering, or Adaptive Loop Filter (ALF) filtering.

15. The method according to claim 1 wherein, in a case that the first filtering is a non-first filtering in a succession of filtering for the pixel, the second pixel value is a pixel value obtained by performing enhancement on a pixel value of the pixel on which previous filtering is performed.

16. The method according to claim 15, wherein the first filtering is horizontal DeBlocking Filter (DBF) filtering, in a case that the pixel meets a vertical DBF filtering condition, the second pixel value is a pixel value of the pixel obtained from performing enhancement on a fifth pixel value of the pixel, and the fifth pixel value is a pixel value obtained from performing vertical DBF filtering on the pixel.

17. The method according to claim 1, wherein the first filtering is vertical DeBlocking Filter (DBF) filtering, and when the pixel value of the pixel has been performed the enhancement, the method further comprises:

in a case that the pixel meets a horizontal DBF filtering condition, performing horizontal DBF filtering on the third pixel value to obtain a sixth pixel value of the pixel; and performing enhancement on the pixel value of the pixel based on the third pixel value and the sixth pixel value to obtain an enhanced seventh pixel value of the pixel.

18. A picture enhancement apparatus, comprising a processor and a memory, wherein the memory stores a computer program and the processor is caused by the computer program to:

determine, for a pixel within a current block that meets a first filtering condition, a first pixel value of the pixel after first filtering; and perform, based on the first pixel value and a second pixel value of the pixel before the first filtering, enhancement on a pixel value of the pixel to obtain an enhanced third pixel value of the pixel;

wherein the performing, based on the first pixel value and the second pixel value of the pixel before the first filtering, the enhancement on the pixel value of the pixel comprises:

performing, based on a difference between the first pixel value and the second pixel value, the enhancement on the pixel value of the pixel;

wherein the performing, based on the difference between the first pixel value and the second pixel value, the enhancement on the pixel value of the pixel comprises:

performing, based on a result of comparing the difference with predetermined thresholds, the enhancement on the pixel value of the pixel;

wherein the performing, based on the result of comparing the difference with the predetermined thresholds, the enhancement on the pixel value of the pixel comprises:

performing, in a case that the difference is greater than a first enhancement filtering threshold, the enhancement on the pixel value of the pixel based on a first enhancement filtering offset; and performing, in a case that the difference is smaller than a second enhancement filtering threshold, the enhancement on the pixel value of the pixel based on a second enhancement filtering offset, wherein the second enhancement filtering threshold is smaller than the first enhancement filtering threshold.

* * * * *